United States Patent
Nakamura et al.

(10) Patent No.: US 8,437,110 B2
(45) Date of Patent: *May 7, 2013

(54) PROTECTION APPARATUS OF LOAD CIRCUIT

(75) Inventors: Yoshihide Nakamura, Shizuoka-ken (JP); Akinori Maruyama, Shizuoka-ken (JP); Keisuke Ueta, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 117 days.

This patent is subject to a terminal disclaimer.

(21) Appl. No.: 12/937,993

(22) PCT Filed: Apr. 15, 2009

(86) PCT No.: PCT/JP2009/057598
§ 371 (c)(1),
(2), (4) Date: Oct. 14, 2010

(87) PCT Pub. No.: WO2009/128478
PCT Pub. Date: Oct. 22, 2009

(65) Prior Publication Data
US 2011/0043958 A1    Feb. 24, 2011

(30) Foreign Application Priority Data

Apr. 15, 2008 (JP) ............... P2008-105730
Nov. 14, 2008 (JP) ............... P2008-292110

(51) Int. Cl.
*H02H 5/04* (2006.01)
*H02H 3/20* (2006.01)
*H02H 9/04* (2006.01)
*H02H 9/08* (2006.01)

(52) U.S. Cl.
USPC .......... 361/93.8; 361/93.1; 361/93.9; 361/94; 361/101; 361/103; 361/104

(58) Field of Classification Search ............... 361/93.8, 361/93.1, 93.9, 94, 101, 103, 104
See application file for complete search history.

(56) References Cited

U.S. PATENT DOCUMENTS

| 5,600,575 A | 2/1997 | Anticole |
| 6,285,292 B1 | 9/2001 | Suptitz et al. |

(Continued)

FOREIGN PATENT DOCUMENTS

| DE | 102006033044 | * 1/2008 |
| EP | 1 850 438 A2 | 10/2007 |

(Continued)

OTHER PUBLICATIONS

Office Action mailed Jun. 21, 2012, in co-pending U.S. Appl. No. 12/933,989, (7 pages).

(Continued)

*Primary Examiner* — Jared Fureman
*Assistant Examiner* — Lucy Thomas
(74) *Attorney, Agent, or Firm* — Finnegan, Henderson, Farabow, Garrett & Dunner, L.L.P.

(57) ABSTRACT

A protection apparatus of a load circuit, comprises: a temperature estimation unit configured to estimate a temperature of an electric wire based on a pseudo-temperature arithmetic expression; and a breaking control unit configured to break a switch portion when the temperature estimated by the temperature estimation unit has reached an allowed temperature of the electric wire. The pseudo-temperature arithmetic expression is set in such a manner that, in a temperature arithmetic expression of the electric wire, the temperature arithmetic expression using the elapsed time counted by the timer, the current detected by the current detection unit, and a heat capacity and conductor resistance of the electric wire, a pseudo-heat capacity smaller than the heat capacity of the electric wire is assigned to the heat capacity, and a pseudo-conductor resistance larger than the conductor resistance of the electric wire is assigned to the conductor resistance.

10 Claims, 21 Drawing Sheets

U.S. PATENT DOCUMENTS

| | | |
|---|---|---|
| 2002/0008951 A1 | 1/2002 | Ohta et al. |
| 2003/0202304 A1 | 10/2003 | Canova et al. |
| 2007/0253132 A1 | 11/2007 | Nakamura et al. |

FOREIGN PATENT DOCUMENTS

| | | |
|---|---|---|
| JP | 7-222345 | 8/1995 |
| JP | 08-174380 | 7/1996 |
| JP | 08-215983 | 8/1996 |
| JP | 8 242533 | 9/1996 |
| JP | 10-285784 | 10/1998 |
| JP | 2001-016880 | 1/2001 |
| JP | 2002-84654 | 3/2002 |
| JP | 2003-100196 | 4/2003 |
| JP | 2004-042260 | 2/2004 |
| JP | 2005-295738 | 10/2005 |
| JP | 2007-043835 | 2/2007 |
| JP | 2007-295776 | 11/2007 |

OTHER PUBLICATIONS

PCT International Search Report for PCT/JP2009/000797, mailed Jun. 7, 2009 (3 pages).

Official Action issued on Dec. 4, 2012, from the Japanese Patent Office in the counterpart Japanese Application.

Notification of the First Office Action in Chinese Application No. 200980113400.0, from the State Itellectual Property Office of the People's Republic of China, Jan. 28, 2013.

* cited by examiner

FIG.4

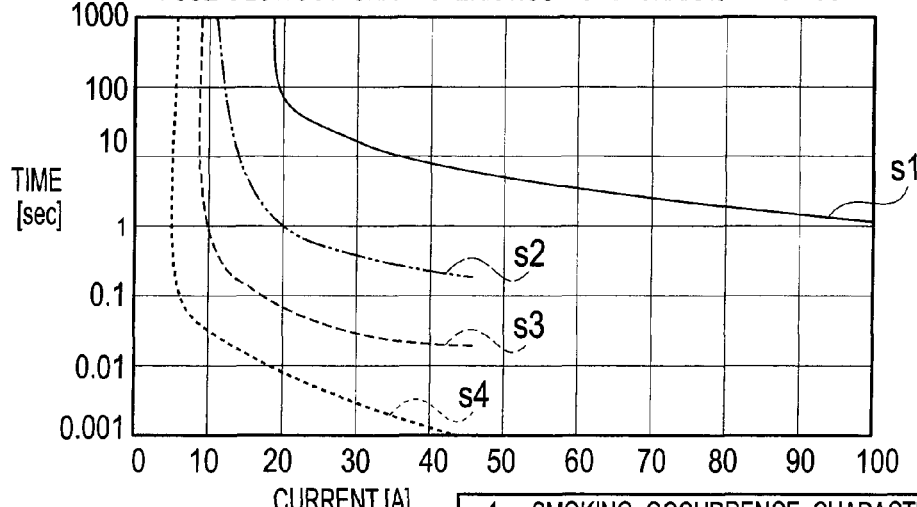

s1 SMOKING OCCURRENCE CHARACTERISTICS OF ELECTRIC WIRE (150 [°C])
s2 FUSE BLOWOUT CHARACTERISTICS (MAX)
s3 FUSE BLOWOUT CHARACTERISTICS (MIN)
s4 LOAD CHARACTERISTICS (BULB)

FIG.5

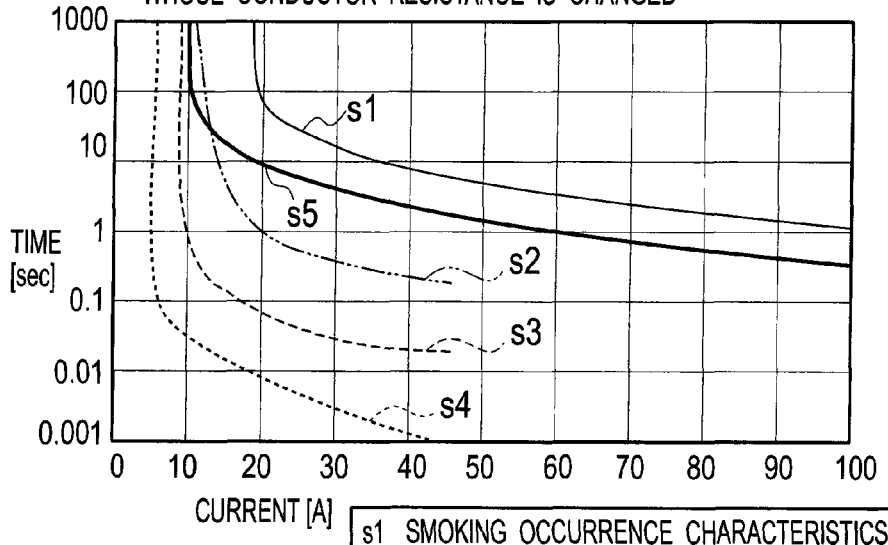

s1 SMOKING OCCURRENCE CHARACTERISTICS OF ELECTRIC WIRE (150 [°C])
s2 FUSE BLOWOUT CHARACTERISTICS (MAX)
s3 FUSE BLOWOUT CHARACTERISTICS (MIN)
s4 LOAD CHARACTERISTICS (BULB)
s5 SMOKING OCCURRENCE CHARACTERISTICS OF ELECTRIC WIRE (A CONDUCTOR RESISTANCE THEREOF IS CHANGED)

FIG. 12
(a)
PATTERN 1 (40[A]ON ⇒ SATURATED TEMPERATURE ⇒ OFF)
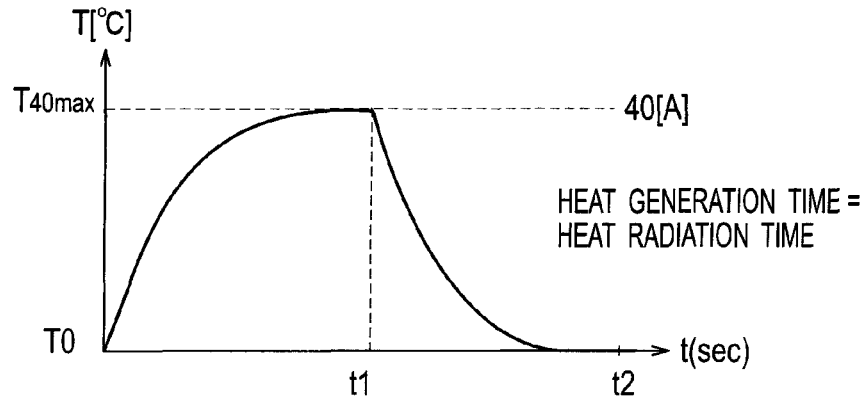
(b)
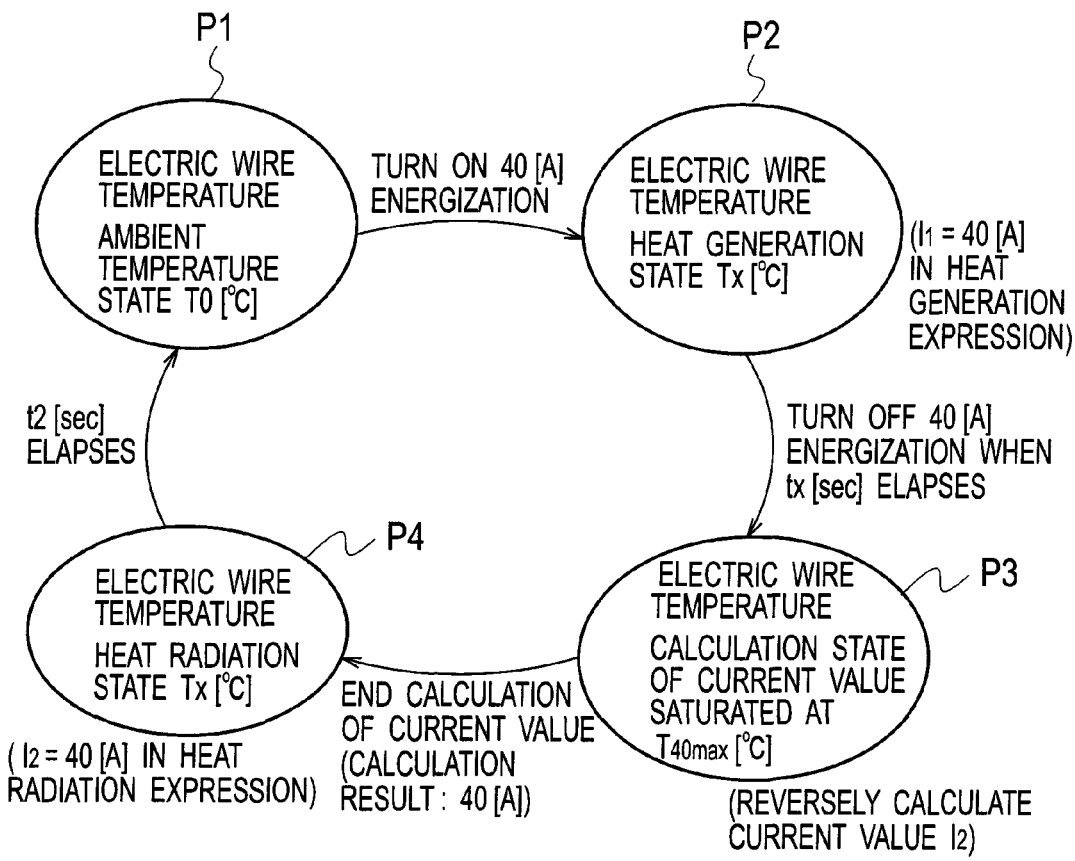

FIG. 13
(a)
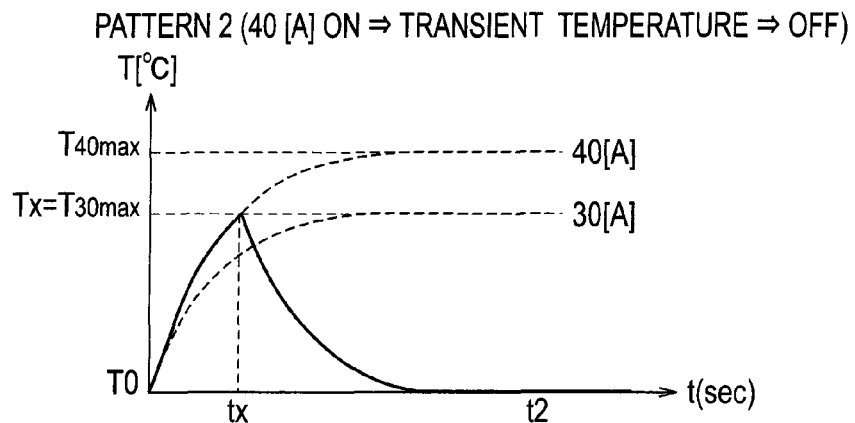
(b)
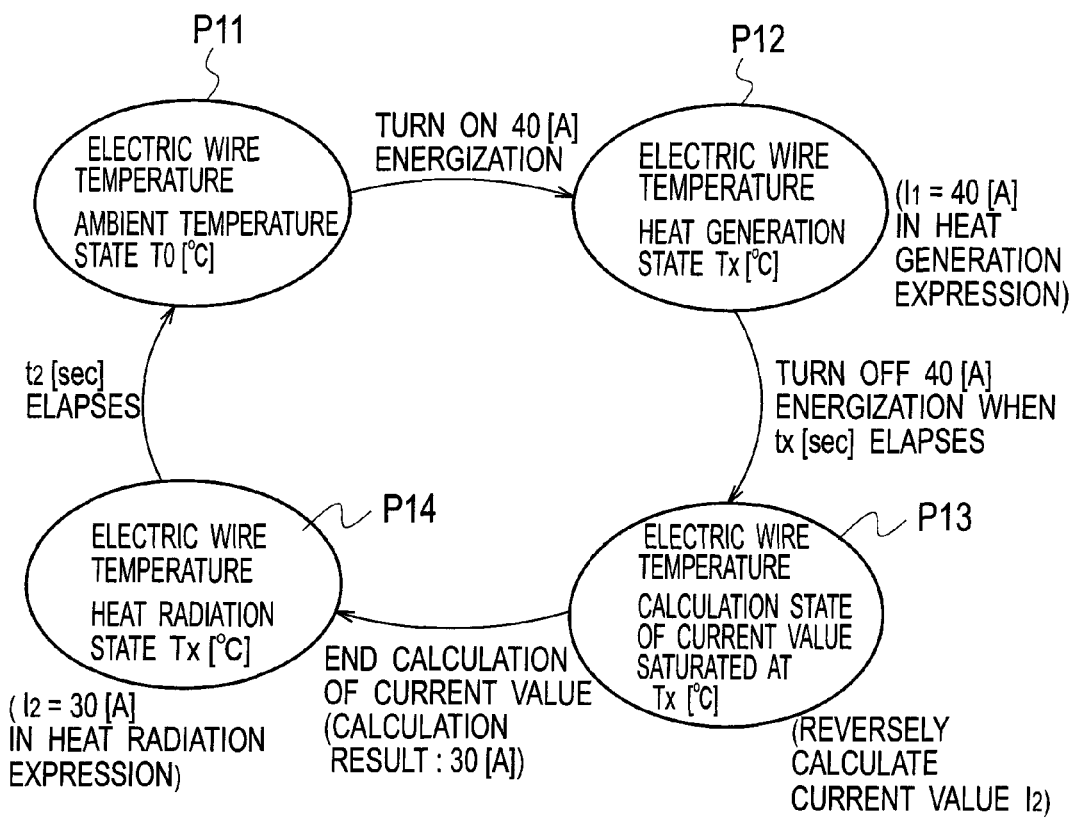

FIG. 14
(a)
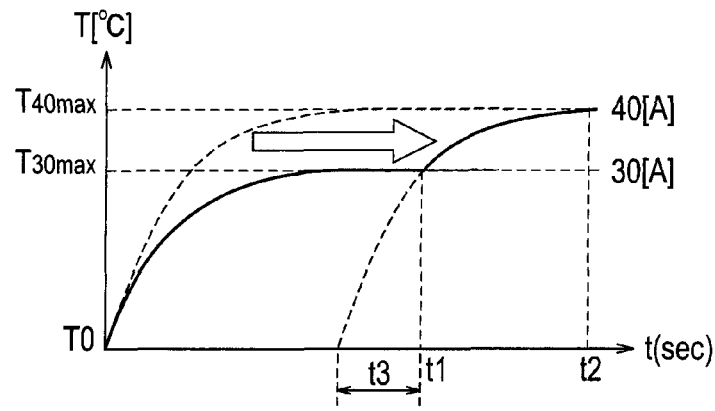
(b)
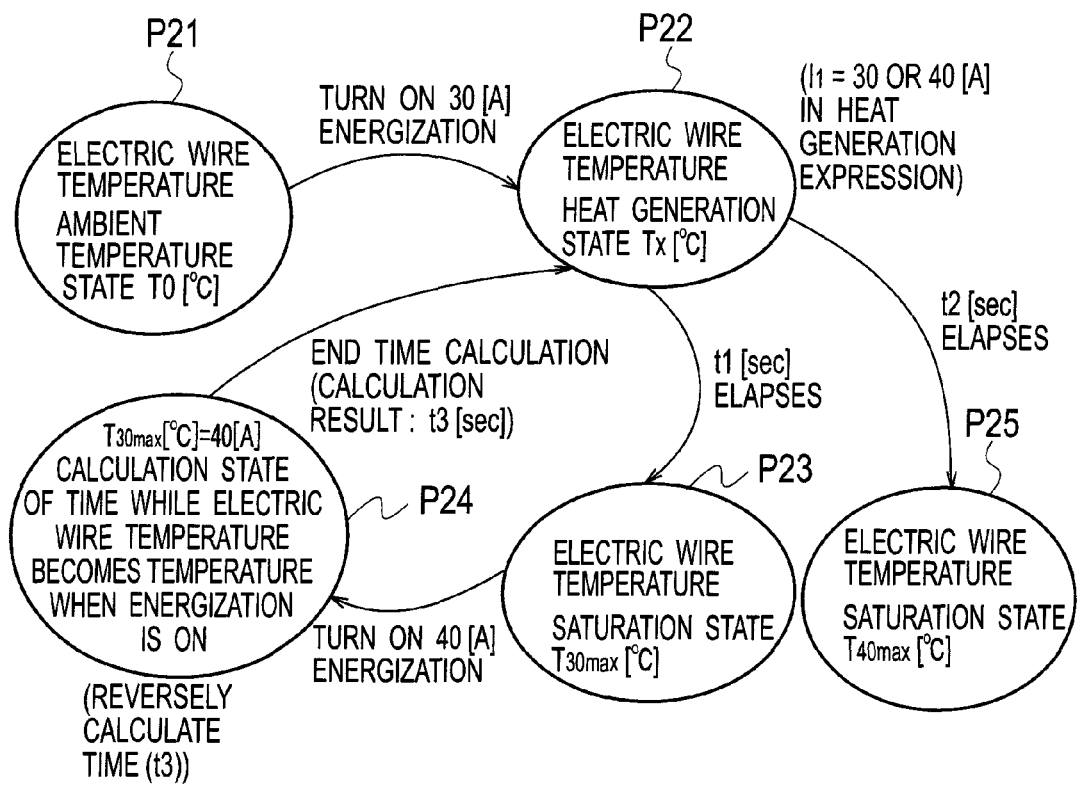

FIG. 15
(a)
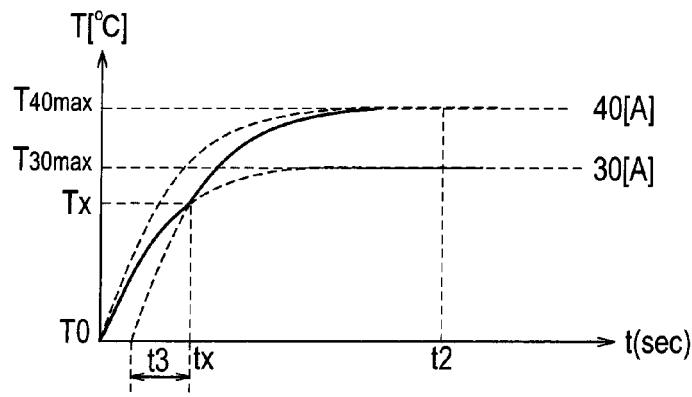
PATTERN 4 (30[A]ON ⇒ TRANSIENT TEMPERATURE ⇒ 40[A]ON)
(b)
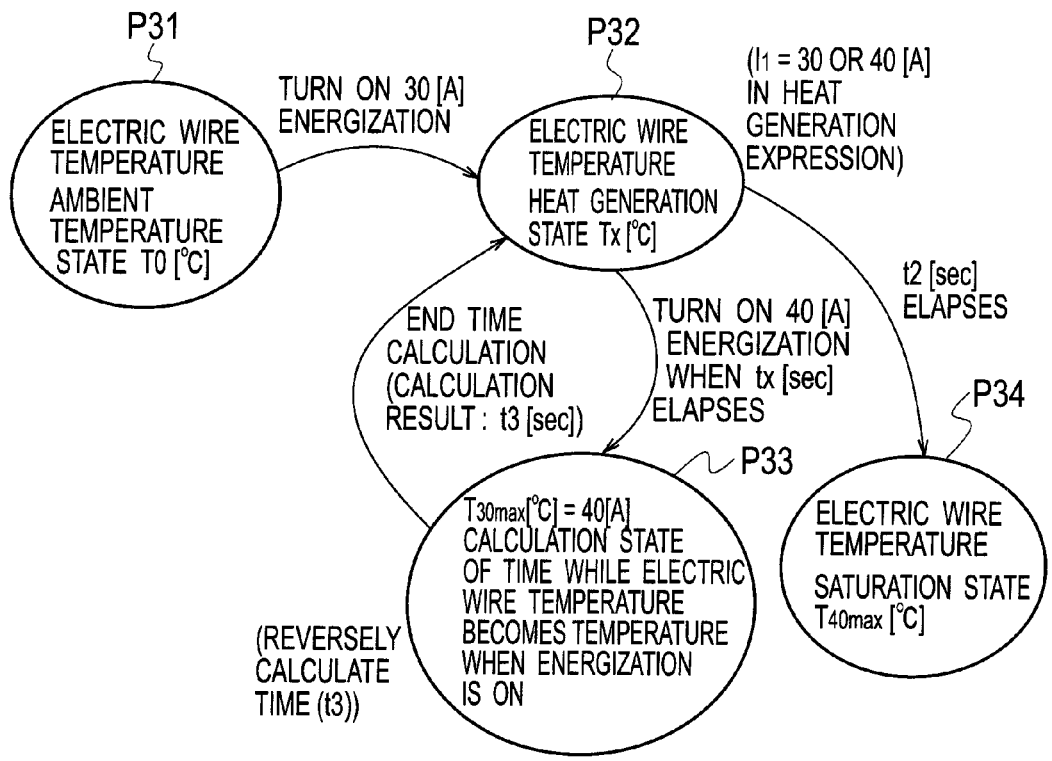

FIG. 16
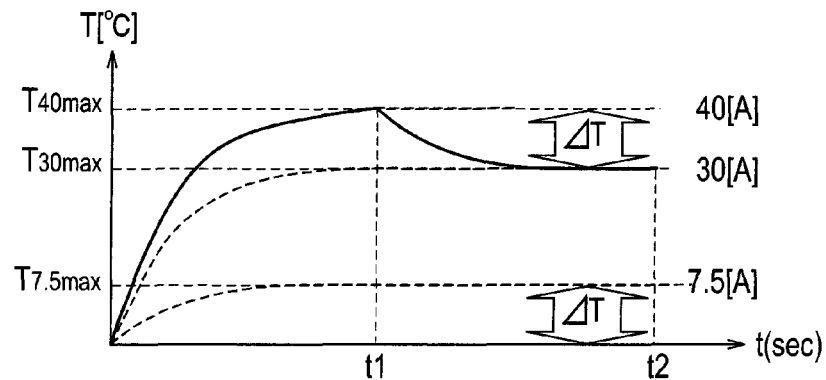
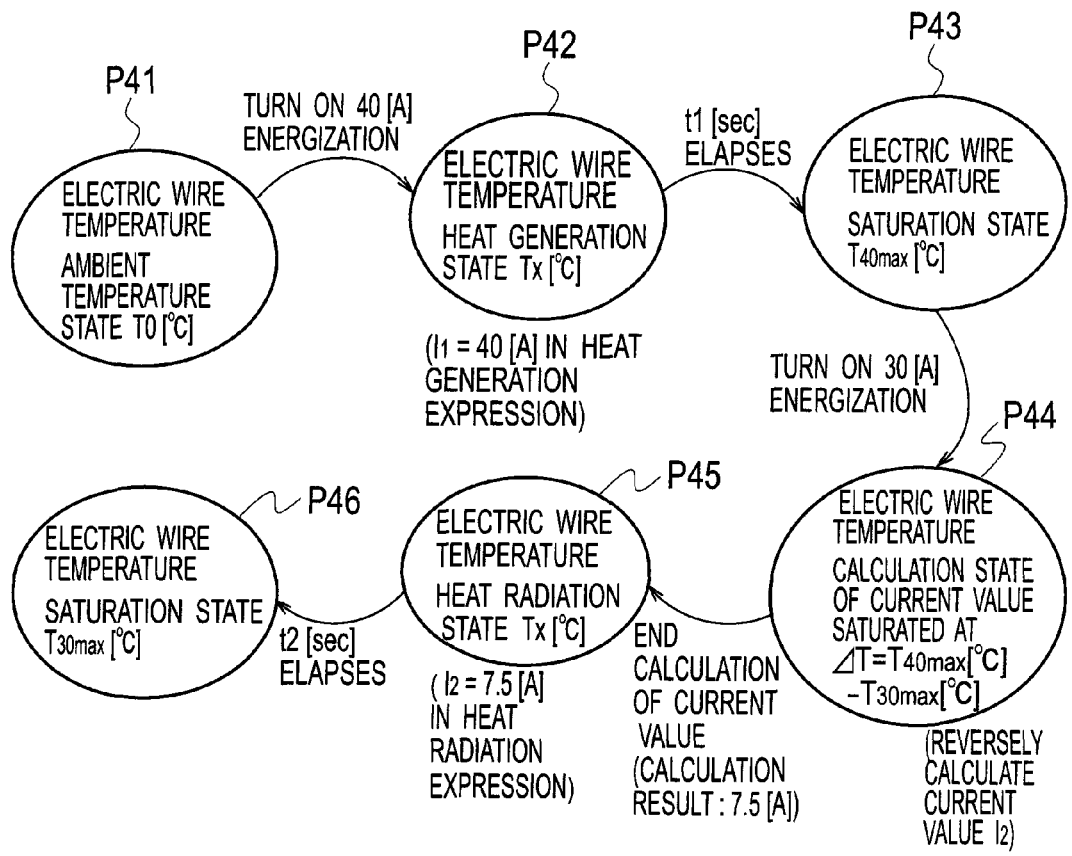

FIG. 17
(a)
PATTERN 6 (40[A]ON ⇒ TRANSIENT TEMPERATURE ⇒ 30[A]ON)
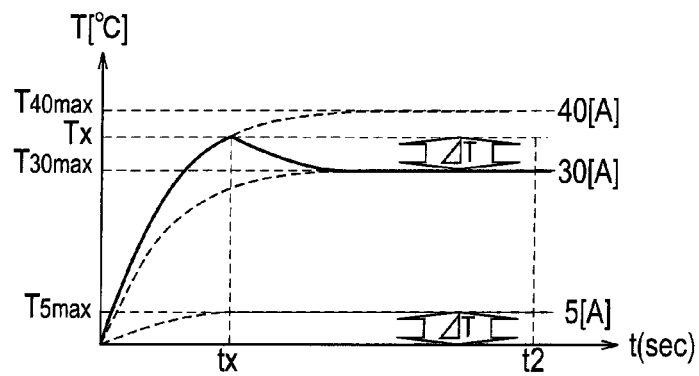
(b)
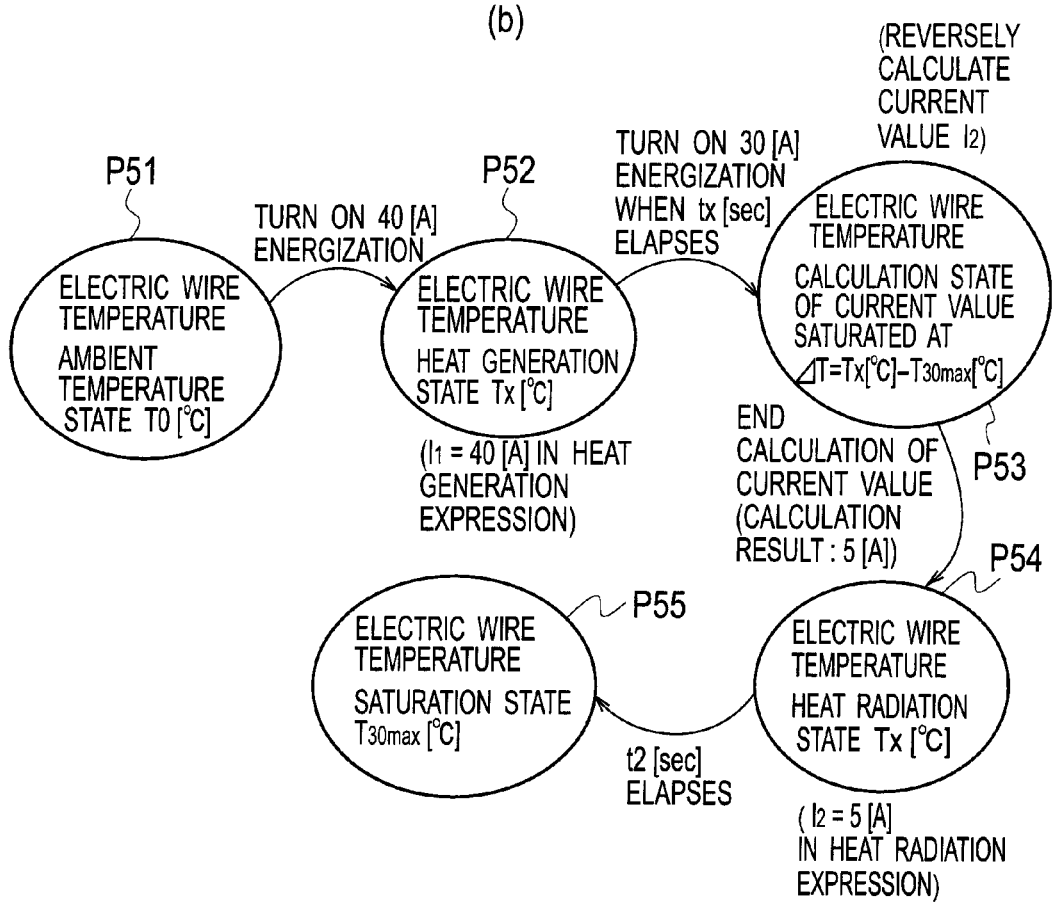

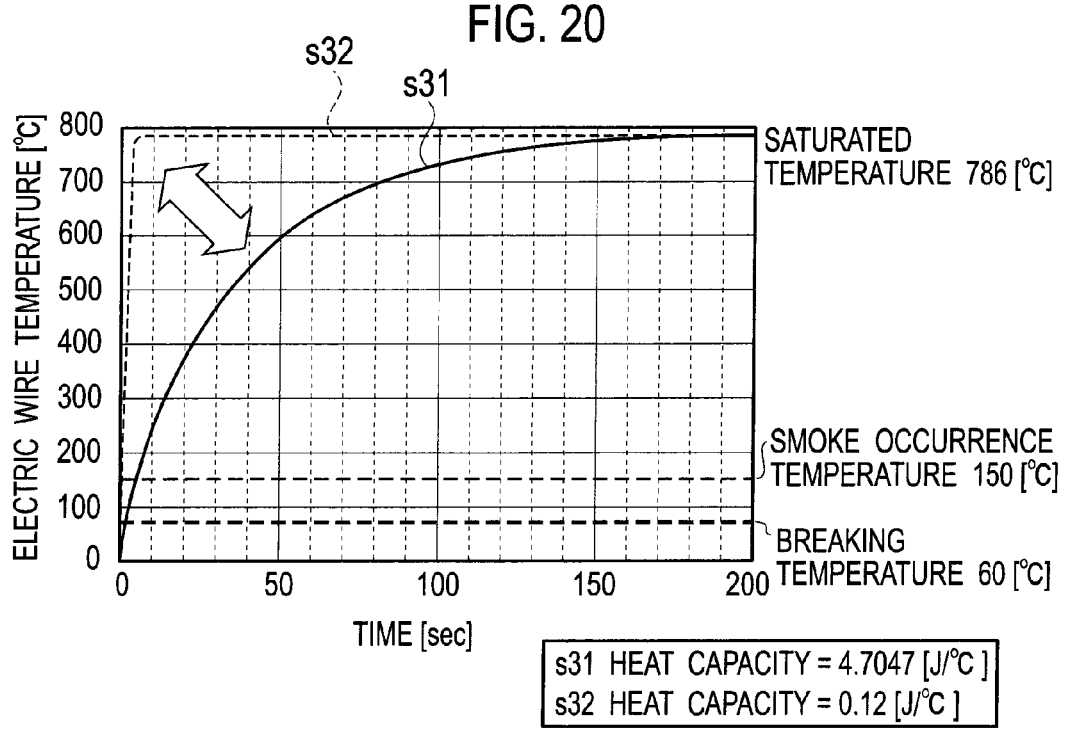
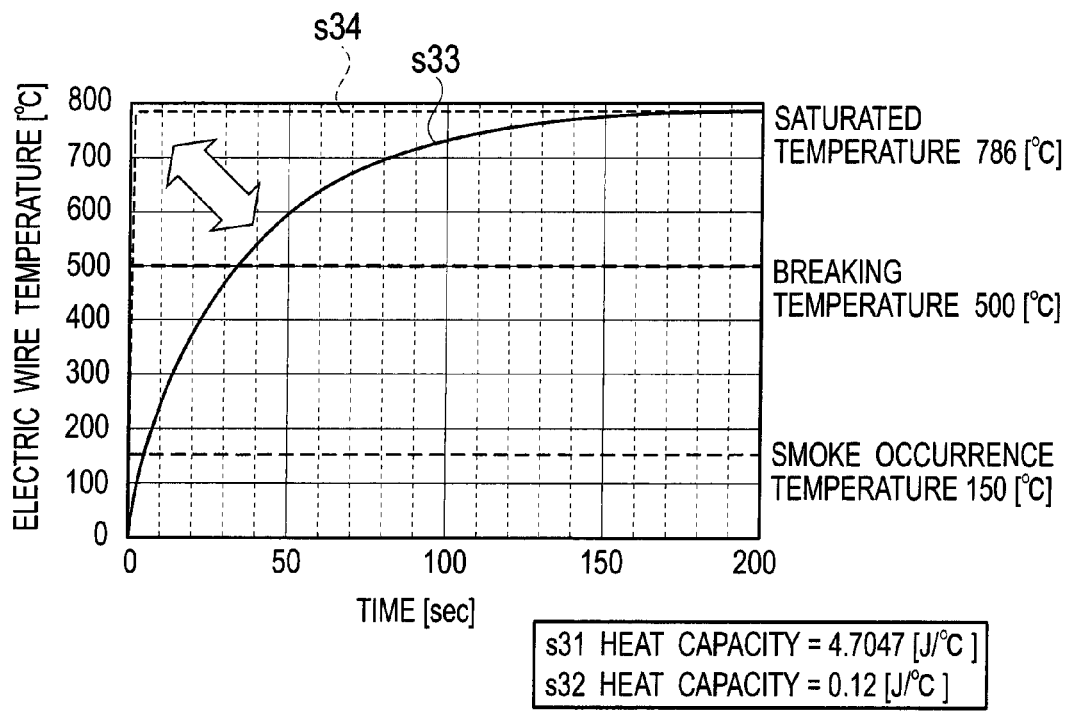

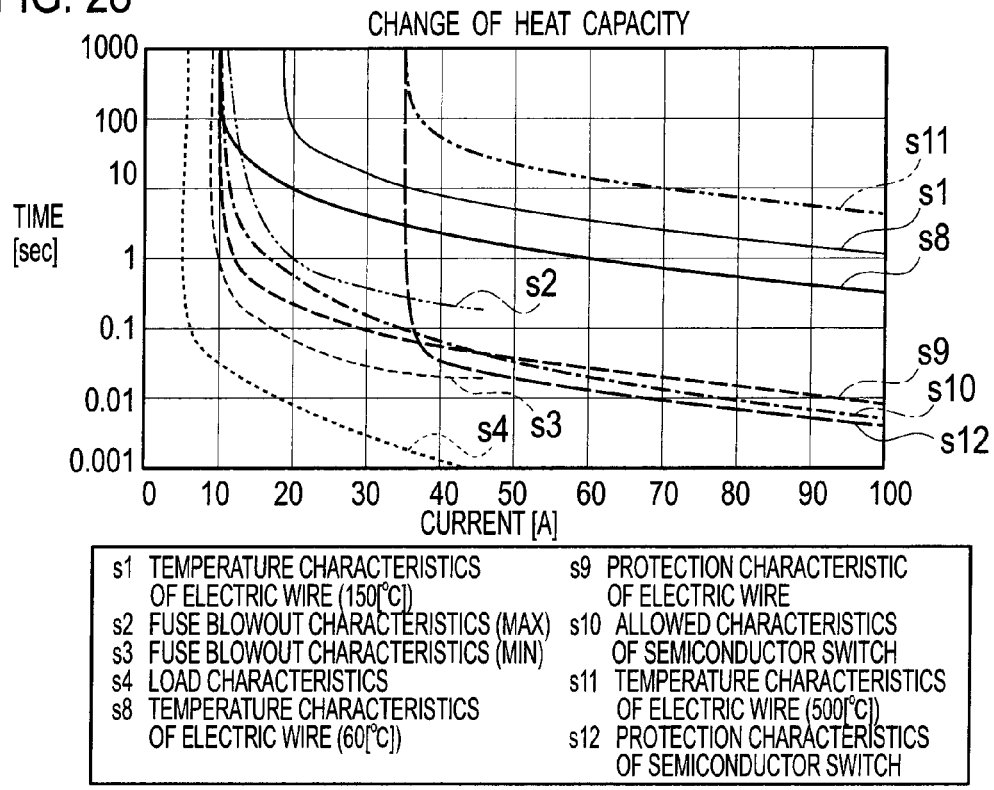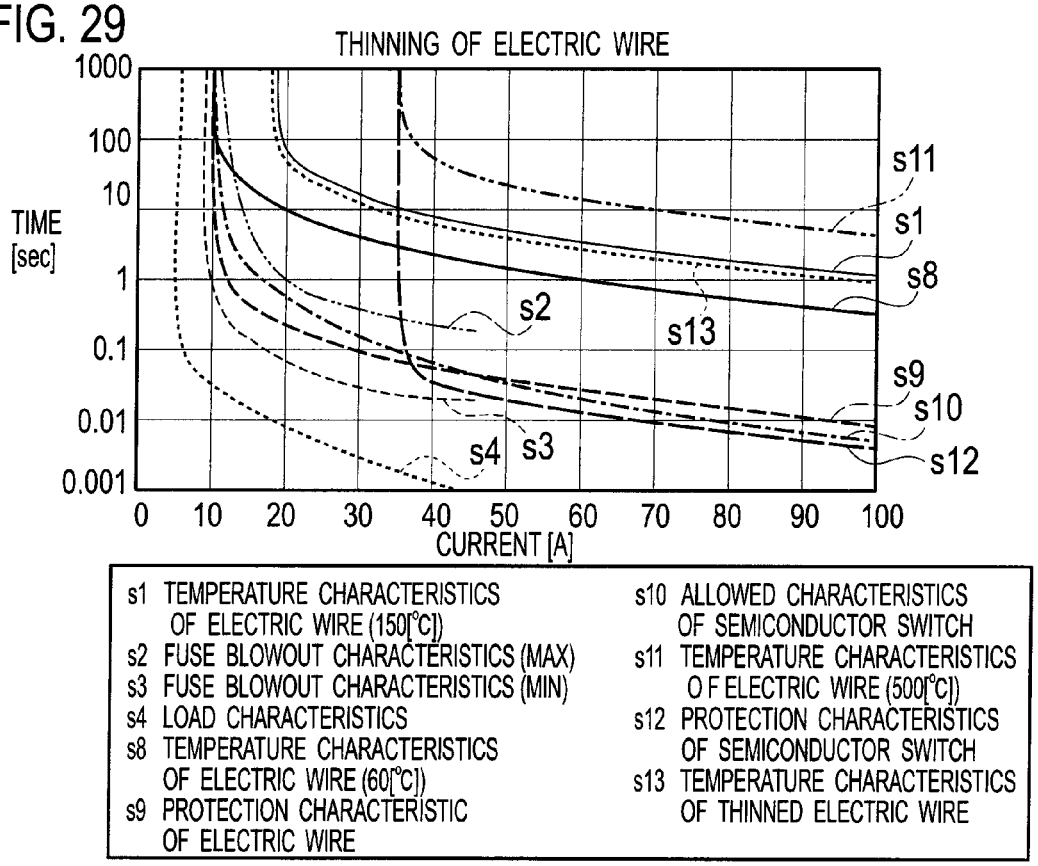

PROTECTION APPARATUS OF LOAD CIRCUIT

TECHNICAL FIELD

The present invention relates to a protection apparatus of a load circuit, which protects the load circuit by breaking the load circuit instantaneously when an overcurrent flows through the circuit to raise temperature of an electric wire and a semiconductor switch.

BACKGROUND ART

A load circuit mounted on a vehicle supplies electric power to loads such as a bulb and a motor. This load circuit includes a battery and semiconductor switches (MOSFETs or the like) provided between the battery concerned and the loads. The battery, the semiconductor switches and the loads are connected to one another through conductors including electric wires. In the load circuit, a control circuit that outputs drive/stop signals for switching ON/OFF the semiconductor switches is further provided. By the drive/stop signals, the loads are switched between driving and stopping.

In the above-described load circuit, fuses are provided. The fuses break the circuit instantaneously when an overcurrent flows through the loads, and thereby protects the loads, the electric wires, the semiconductor switches and the like (refer to Patent Citation 1).

FIG. 1 is an explanatory view schematically showing a conventional load circuit. Power supply-side terminals 101 are connected to a battery VB through an automotive electronic control unit (ECU) 102 and a junction box (J/B) 103.

In the ECU 102, a plurality of semiconductor switches Tr1 such as MOSFETs are provided. ON/OFF of the semiconductor switches Tr1 are controlled by a control IC 104. Fuses F1 are provided upstream of the respective semiconductor switches Tr1. The fuses F1 protect electric wires W101 provided downstream of the fuses F1 concerned. In other words, the electric wires W101 have an electric wire diameter (cross-sectional area) enough to withstand a breaking current of the fuses F1. Moreover, the semiconductor switches Tr1 provided downstream of the fuses F1 have characteristics of being capable of withstanding the breaking current of the fuses F1.

Moreover, in the J/B 103, fuses F2 are provided. The fuses F2 protect an electric wire W102 provided downstream of the fuses F2. In other words, the electric wires W102 have a diameter (cross-sectional area) enough to withstand a breaking current of the fuses F2.

Here, for example, when bulbs are used as the loads 101, there is a possibility that the fuses F1 and F2 may be deteriorated owing to rush currents generated when the bulbs are turned ON, and to repetition of ON/OFF the bulbs. Therefore, in some case, erroneous breakdown of the fuses F1 and F2 occurs, which results from the deterioration of the fuses F1 and F2. Here, the deterioration is caused because the fuses F1 and F2 are used for years. In order to prevent such a trouble, fuses for which a margin for a load current is considered are selected. Specifically, fuses are used, in which the breaking current is set somewhat higher than usual. As a result, it is necessary to use electric wires, semiconductor switches and the like, which are adapted to characteristics of the fuses for which the margin is considered, and it has become difficult to miniaturize the electric wires and the semiconductor switches, which are used for the load circuit.

CITATION LIST

Patent Literature

Patent Citation 1: Japanese Patent Laid-Open Publication No. 2003-100196

SUMMARY OF INVENTION

Technical Problem

Nowadays, a request is being increased that the semiconductor switches and the electric wires, which are used in the load circuit, be miniaturized as much as possible. Meanwhile, as mentioned above, for the fuses, the margin for preventing the erroneous breakdown resulting from the deterioration caused by the use thereof for years is considered, and therefore, the conventional load circuit has a disadvantage that it is difficult to miniaturize the electric wires and the semiconductor switches.

The present invention has been made in order to solve the problem as described above. It is an object of the present invention to provide a protection apparatus of a load circuit, which is capable of miniaturizing the semiconductor switches and the electric wires by a switch circuit simulating the fuses.

Solution to Problem

A first aspect of the present invention is a protection apparatus of a load circuit, including: a timer configured to count an elapsed time of a current flowing through a load via an electric wire; a current detection unit configured to detect the current; a switch portion configured to switch supply and interruption of the current; a temperature estimation unit configured to estimate a temperature of the electric wire based on a pseudo-temperature arithmetic expression; and a breaking control unit configured to break the switch portion when the temperature estimated by the temperature estimation unit has reached an allowed temperature of the electric wire. The pseudo-temperature arithmetic expression is set in such a manner that, in a temperature arithmetic expression of the electric wire, the temperature arithmetic expression using the elapsed time counted by the timer, the current detected by the current detection unit, and a heat capacity and conductor resistance of the electric wire, a pseudo-heat capacity smaller than the heat capacity of the electric wire is assigned to the heat capacity, and a pseudo-conductor resistance larger than the conductor resistance of the electric wire is assigned to the conductor resistance.

It is preferable that the breaking control unit turn the switch portion to a connection-enabled state when the temperature estimated by the temperature estimation unit has dropped to an ambient temperature or lower after the switch portion was broken.

It is preferable that the pseudo-conductor resistance and the pseudo-heat capacity be set so that current/breaking time characteristics of the electric wire, which are based on the pseudo-temperature arithmetic expression, can be lower than current/breaking time characteristics of an electric wire smaller in diameter than the electric wire for use in the load circuit.

It is preferable that the pseudo-conductor resistance and the pseudo-heat capacity be set so that current/breaking time characteristics which are based on the pseudo-temperature arithmetic expression can be located between minimum current/breaking time characteristics of a fuse protecting the electric wire and maximum current/breaking time characteristics of the fuse.

A second aspect of the present invention is a protection apparatus of a load circuit, including: a timer configured to count an elapsed time of a current flowing through a load via an electric wire; a current detection unit configured to detect the current; a first temperature arithmetic operation unit configured to estimate a temperature of the electric wire based on a first pseudo-heat generation temperature arithmetic expression and a first pseudo-heat radiation temperature arithmetic expression; a second temperature arithmetic operation unit configured to estimate the temperature of the electric wire based on a second pseudo-heat generation temperature arithmetic expression and a second pseudo-heat radiation temperature arithmetic expression; an overcurrent determination unit configured to determine that, when the current detected by the current detection unit is smaller than a preset predetermined threshold current, and an estimated temperature calculated by the first temperature arithmetic operation unit has reached a first allowed temperature, the current thus detected is an overcurrent, and when the current detected by the current detection unit is equal to or larger than the threshold current, and an estimated temperature calculated by the second temperature arithmetic operation unit has reached a second allowed temperature, the current thus detected is an over current; and a breaking control unit configured to break the switch portion when the overcurrent determination unit has determined that the detected current is the overcurrent. The first pseudo-heat generation temperature arithmetic expression and the first pseudo-heat radiation temperature arithmetic expression are set in such a manner that, in a temperature arithmetic expression of the electric wire, the temperature arithmetic expression using the elapsed time counted by the timer, the current detected by the current detection unit, and a heat capacity and conductor resistance of the electric wire, a first pseudo-heat capacity is assigned to the heat capacity, the second pseudo-heat generation temperature arithmetic expression and the second pseudo-heat radiation temperature arithmetic expression are set in such a manner that a second pseudo-heat capacity is assigned to the heat capacity in the temperature arithmetic expression of the electric wire, and the first and second pseudo-heat capacities are different from each other.

It is preferable that the breaking control unit turn the switch portion to a connection-enabled state when the temperatures of the electric wire, which are estimated by the first temperature arithmetic operation unit and the second temperature arithmetic operation unit, have dropped to an ambient temperature after the switch portion was broken.

It is preferable that the first pseudo-heat capacity be set so that current/breaking time characteristics which are based on the first pseudo-heat generation temperature arithmetic expression and the first pseudo-heat radiation arithmetic expression can be located between minimum current/breaking time characteristics of a fuse protecting the electric wire and maximum current/breaking time characteristics of the fuse.

It is preferable that the second pseudo-heat capacity be set so that current/breaking time characteristics which are based on the second pseudo-heat generation temperature arithmetic expression and the second pseudo-heat radiation arithmetic expression can be lower than current/breaking time characteristics of an electronic switch through which the current flows, the electronic switch being used for the load circuit.

It is preferable that a value of the first pseudo-heat capacity be smaller than a value of the heat capacity of the electric wire, and that a value of the second pseudo-heat capacity be smaller than a value of the first pseudo-heat capacity.

It is preferable that the first allowed temperature be lower than the second allowed temperature.

In the protection apparatuses of a load circuit according to the above-described first and second aspects, it is preferable that the temperature arithmetic expression of the electric wire be:

$$T2 = T1 + I1^2 rR\{1 - \exp[-t/(C \cdot R)]\} \quad (1)$$

$$T2 = T1 + I2^2 rR\{\exp[-t/(C \cdot R)]\} \quad (2)$$

Here, Expression (1) is a temperature arithmetic expression at a time of heat generation, and Expression (2) is a temperature arithmetic expression at a time of heat radiation. In the above-described expressions, T1 is an ambient temperature [° C.], T2 is an estimated temperature [° C.] of the electric wire, I1 and I2 are energization currents [A], r is an electric wire conductor resistance [Ω], R is a thermal resistance [° C./W], C is a heat capacity [J/° C.], and t is a time [sec].

Advantageous Effects of Invention

In the protection apparatus of a load circuit according to the present invention, the circuit is broken before the temperature of the electric wire reaches the actual allowed temperature thereof, and the electric wire, the semiconductor switch, the load and the like are protected from overheating. Moreover, unlike the conventional fuses, no deterioration occurs owing to the rush currents and the repetition of the ON/OFF of the loads, and it is not necessary to ensure the margin for the breaking temperature. Therefore, it becomes possible to achieve the miniaturization/weight reduction of the electric wire and the semiconductor switch. Hence, an effect of improving fuel consumption can be exerted.

BRIEF DESCRIPTION OF DRAWINGS

FIG. 4 is an explanatory chart showing current/breaking time characteristics in the protection apparatus of the load circuit according to the embodiment of the present invention.

FIG. 5 is an explanatory chart showing current/breaking time characteristics in the protection apparatus of the load circuit according to the embodiment of the present invention.

FIGS. 12(a) and 12(b) are explanatory views showing a calculation procedure of an electric wire temperature by heat generation and a calculation procedure of an electric wire temperature by heat radiation in the protection apparatus of the load circuit according to the embodiment of the present invention: FIG. 12(a) shows a change of the electric wire temperature; and FIG. 12(b) shows states thereof.

FIGS. 13(a) and 13(b) show a calculation procedure of the electric wire temperature by the heat generation and a calculation procedure of the electric wire temperature by the heat radiation in the protection apparatus of the load circuit according to the embodiment of the present invention: FIG. 13(a) is a characteristic chart showing changes of the electric wire temperature; and FIG. 13(b) is an explanatory view showing states thereof.

FIGS. 14(a) and 14(b) show a calculation procedure of the electric wire temperature by the heat generation and a calculation procedure of the electric wire temperature by the heat radiation in the protection apparatus of the load circuit according to the embodiment of the present invention: FIG. 14(a) is a characteristic chart showing changes of the electric wire temperature; and FIG. 14(b) is an explanatory view showing states thereof.

FIGS. 15(a) and 15(b) show a calculation procedure of the electric wire temperature by the heat generation and a calculation procedure of the electric wire temperature by the heat radiation in the protection apparatus of the load circuit according to the embodiment of the present invention: FIG. 15(a) is a characteristic chart showing changes of the electric wire temperature; and FIG. 15(b) is an explanatory view showing states thereof.

FIGS. 16(a) and 16(b) show a calculation procedure of the electric wire temperature by the heat generation and a calculation procedure of the electric wire temperature by the heat radiation in the protection apparatus of the load circuit according to the embodiment of the present invention: FIG. 16(a) is a characteristic chart showing changes of the electric wire temperature; and FIG. 16(b) is an explanatory view showing states thereof.

FIGS. 17(a) and 17(b) show a calculation procedure of the electric wire temperature by the heat generation and a calculation procedure of the electric wire temperature by the heat radiation in the protection apparatus of the load circuit according to the embodiment of the present invention: FIG. 17(a) is a characteristic chart showing changes of the electric wire temperature; and FIG. 17(b) is an explanatory view showing states thereof.

FIG. 20 is an explanatory chart in accordance with the protection apparatus of the load circuit according to the second embodiment of the present invention, showing characteristics of an electric wire conductor temperature when a heat capacity of an electric wire is changed.

FIG. 21 is an explanatory chart in accordance with the protection apparatus of the load circuit according to the second embodiment of the present invention, showing characteristics of the electric wire conductor temperature when the heat capacity of the electric wire is changed.

FIG. 28 is an explanatory chart showing current/breaking time characteristics in the protection apparatus of the load circuit according to the second embodiment of the present invention.

FIG. 29 is an explanatory chart showing current/breaking time characteristics in the protection apparatus of the load circuit according to the second embodiment of the present invention.

DESCRIPTION OF EMBODIMENTS

Figure 2:
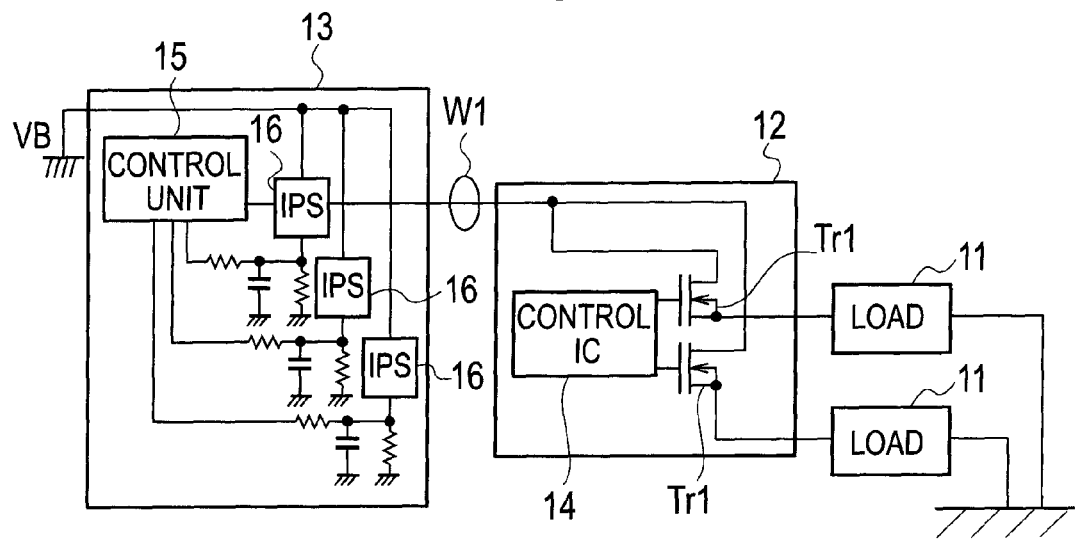
FIG. 2 is a circuit diagram showing a configuration of a protection apparatus of a load circuit according to an embodiment of the present invention.

A description is made below of embodiments of the present invention based on the drawings. FIG. 2 is a circuit diagram showing a configuration of a load circuit to which a protection apparatus according to an embodiment of the present invention is applied.

The load circuit shown in FIG. 2 is a circuit that supplies electric power, which is outputted from a battery VB (power supply), to loads 11, for example, such as a bulb and a motor, which are mounted on a vehicle, and controls drive and stop of the respective loads 11. This load circuit includes: an automotive electronic control unit (hereinafter, CPU); and a junction box (hereinafter, J/B) 13.

The ECU 12 includes a plurality of electronic switches (semiconductor switches) Tr1 such as MOSFETs. One-side terminals of the respective electronic switches Tr1 are connected to the loads 11, and other-side terminals thereof are connected to the J/B 13 through an electric wire W1. The ECU 12 includes a control IC 14. The control IC 14 controls ON/OFF of the respective electronic switches Tr1, whereby the drive and stop of the loads 11 are controlled.

The J/B 13 includes a plurality of switch circuits 16 (shown by "IPS" in FIG. 2) which connect the electric wire W1 and the battery VB to each other. The switch circuits 16 operate under control of a control unit 15.

First Embodiment

Figure 3:
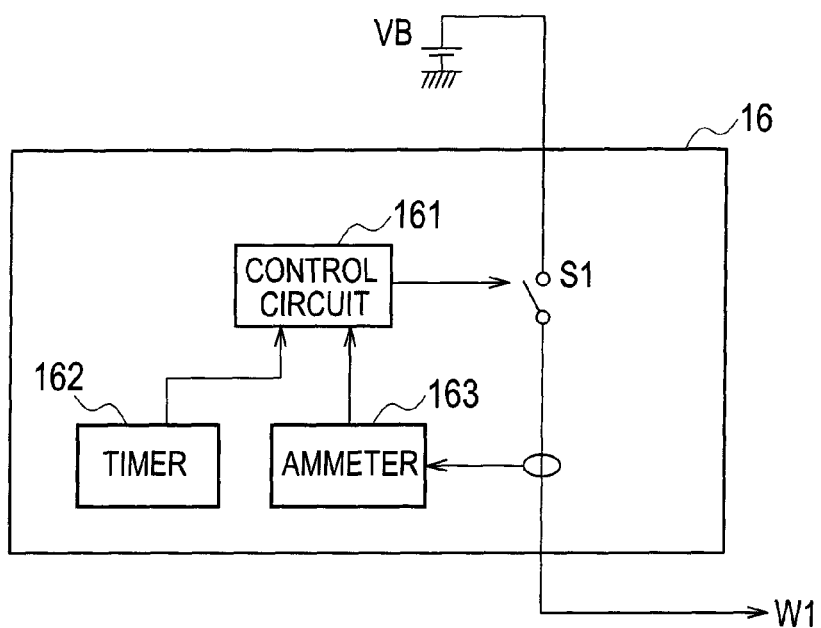
FIG. 3 is a block diagram showing a configuration of a switch circuit in the protection apparatus of the load circuit according to the embodiment of the present invention.

FIG. 3 is a block diagram showing a detailed configuration of each of the switch circuits 16 according to a first embodiment of the present invention. As shown in FIG. 2, each of the switch circuits 16 includes: a semiconductor relay S1 (switch portion); an ammeter 163 that detects a current flowing through the electric wire W1; a timer 162 that counts an elapsed time while the current is flowing through the electric wire W1; and a control circuit 161 that controls ON/OFF of the semiconductor relay S1 based on a value of the current detected by the ammeter 163 and on the time counted by the timer 162.

The control circuit (temperature estimation unit, breaking control unit) 161 estimates a virtual temperature of the electric wire W1 (not an actual temperature of the electric wire W1 but a temperature defined by a pseudo-temperature arithmetic expression) based on a method to be described later (estimation method of the electric wire temperature by the pseudo-temperature arithmetic expression). Moreover, when the virtual temperature of the electric wire W1 reaches an allowed temperature of the electric wire W1 (a temperature at which the electric wire W1 causes smoking owing to overheating, for example, 150° C.), the control circuit 161 breaks the current, which flows through the electric wire W1, by the electronic switch S1, and protects the electronic wire W1, and the respective electronic switches Tr1 and the respective loads 11, which are provided downstream of the electronic wire W1 concerned.

A description is made below in detail of the method of estimating the temperature of the electric wire W1. Expression (1) shown below is a general expression that represents an electric wire temperature at the time of heat generation. Expression (2) is a general expression that represents an electric wire temperature at the time of heat radiation.

$$T2 = T1 + I1^2 rR\{1 - \exp[-t/(C \cdot R)]\} \quad (1)$$

$$T2 = T1 + I2^2 rR\{\exp[-t/(C \cdot R)]\} \quad (2)$$

In Expressions (1) and (2), T1 is an ambient temperature [° C.], T2 is the estimated temperature [° C.] of the electric wire, I1 is an energization current [A], r is a conductor resistance [Ω] of the electric wire, R is a thermal resistance [° C./W], C is a heat capacity [J/° C.], and t is a time [sec]. I2 is an estimated current in a saturated temperature which is the sum of a difference temperature ΔT and the ambient temperature T1. The difference temperature ΔT is a difference, when the electric wire is changed from a heat generation state to a heat radiation state, between an electric wire temperature immediately before such a change and a saturated temperature calculated from a detected current immediately after the change, which is based on Expression (1). Note that the above-described ambient temperature T1 is determined in consideration of an environment where the circuit is provided. Alternatively, a thermometer (not shown) may be placed, and a temperature detected by the thermometer may be assigned to the ambient temperature T1. Moreover, in the calculation of the electric wire temperature at the time of heat radiation, which is shown in Expression (2), the ambient temperature T1 is sometimes replaced by a saturated temperature calculated from the current at the time of heat radiation (refer to Patterns 5 and 6 to be described later).

Hence, the ambient temperature T1, the current I1 and the time t are assigned to Expression (1), whereby the estimated temperature T2 of the electric wire W1 at the time of heat generation can be obtained. The ambient temperature T1, the current I2 and the time t are assigned to Expression (2), whereby the estimated temperature T2 of the electric wire W1 at the time of heat radiation can be obtained.

If the switch circuit 16 is broken when the estimated temperature T2 reaches a predetermined threshold temperature, then the whole of the load circuit including the electric wire W1 can be protected. For example, when the allowed temperature of the electric wire W1 is 150° C., the threshold temperature is set at 50° C. In such a setting, the circuit is broken before the electric wire W1 reaches the allowed temperature to cause smoking owing to heat generation by an overcurrent, and accordingly, the whole of the load circuit including the electric wire W1 can be protected. Hence, it is not necessary to provide any fuse upstream of the load circuit as in the conventional load circuit.

In this embodiment, the threshold temperature is set at the allowed temperature of the electric wire, and values of the conductor resistance r and the heat capacity C, which are shown in Expressions (1) and (2) described above, are changed, whereby a setting is made so that the circuit can be broken at a temperature substantially lower than the allowed temperature. Specifically, a value "r*" (pseudo-conductor resistance) larger than the actual conductor resistance of the electric wire is assigned to the above-described conductor resistance r, and a value "C*" (pseudo-heat capacity) smaller than the actual heat capacity of the electric wire is assigned to the above-described heat capacity C.

The electric wire temperatures T2 are calculated by arithmetic expressions (pseudo-temperature arithmetic expressions) in which the pseudo-conductor resistance r* is assigned to Expressions (1) and (2) described above. Then, at the time of heat generation, a temperature higher than the actual temperature is calculated. This is described below with reference to characteristic charts shown in FIG. 8 and FIG. 9.

Figure 8:
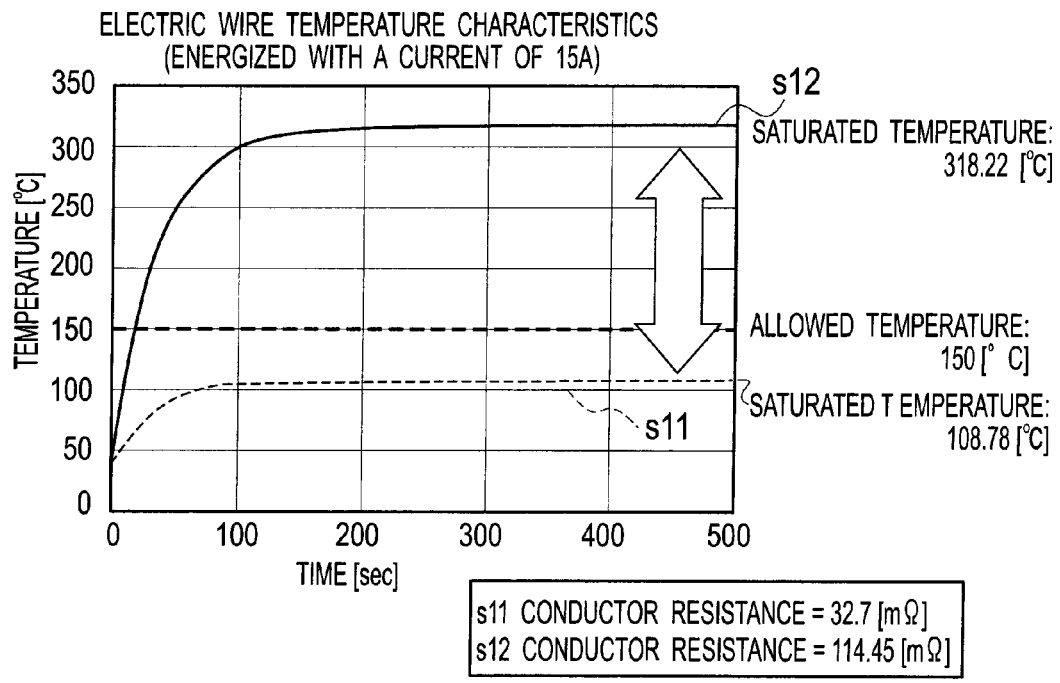
FIG. 8 is an explanatory chart showing current/breaking time characteristics when a conductor resistance is changed in a protection apparatus of a load circuit according to a first embodiment of the present invention.

FIG. 8 is a characteristic chart showing a change of an electric wire temperature when a current of 15 [A] is continuously passed to an electric wire in which an allowed temperature is 150° C. (hereinafter, referred to as a sample electric wire). A curve s11 is a characteristic curve when the conductor resistance r shown in Expression (1) is set at 32.7 [mΩ] equal to the conductor resistance r of this sample electric wire (in the case of using a usual conductor resistor). A curve s12 is a characteristic curve when the conductor resistance r shown in Expression (1) is set at 114.45 [mΩ] equal to the pseudo-conductor resistance r*.

As shown by the curve s11, when the current of 15 [A] is flown through the sample electric wire, the electric wire temperature is saturated at 108.78° C. Specifically, even if the current of 15 [A] is continuously flown through the sample electric wire for a long time, the electric wire temperature does not reach 150° C. as the allowed temperature. As opposed to this, as shown by the curve s12, when the electric wire temperature is estimated based on Expression (1) (pseudo-temperature arithmetic expression) using the pseudo-conductor resistance r* (hereinafter, this is referred to as a "first reference electric wire temperature"), the electric wire temperature is saturated at 318.22° C., and exceeds 150° C. as the allowed temperature at the point of time when approximately 20 [sec] elapses.

From the above-described fact, the pseudo-conductor resistance r* is used as the conductor resistance r for use in Expressions (1) and (2), whereby the first reference electric wire temperature higher than the actual electric wire temperature is obtained. Specifically, if the pseudo-temperature arithmetic expressions in which the pseudo-conductor resistance r* is assigned to Expressions (1) and (2) are used, then the first reference temperature reaches the allowed temperature even when the electric wire temperature does not actually reach 150° C. as the allowed temperature. Hence, the load circuit is broken when the first reference electric wire temperature reaches the allowed temperature, whereby the electric wire and such circuit constituents can be protected.

Figure 9:
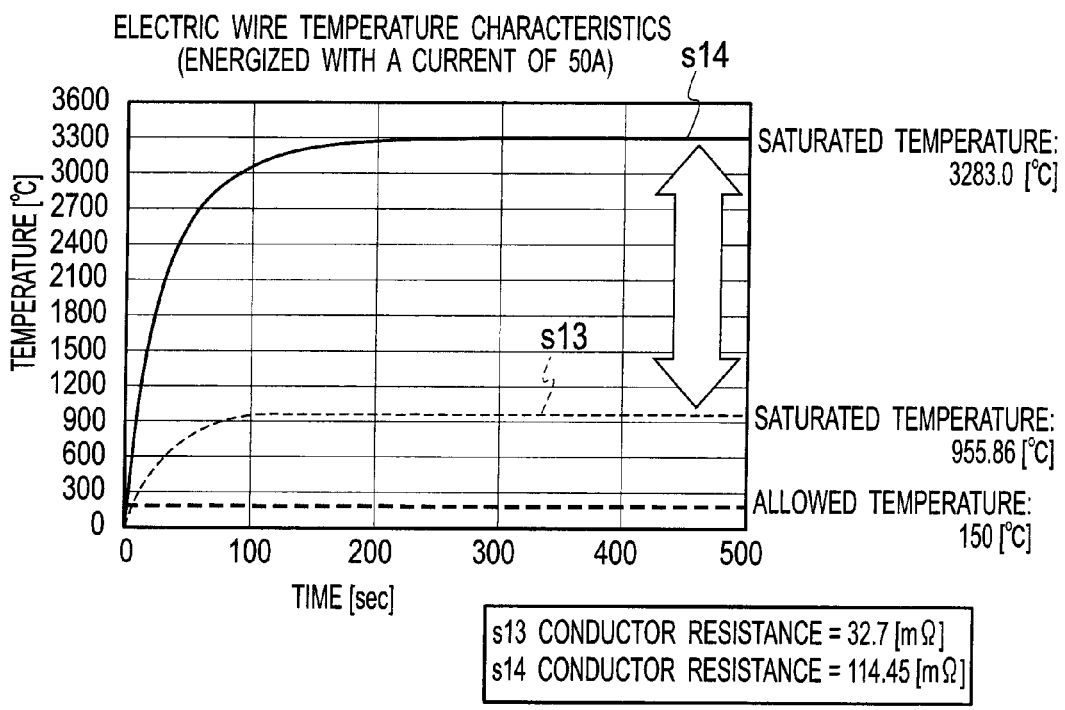
FIG. 9 is an explanatory chart showing current/breaking time characteristics when the conductor resistance is changed in the protection apparatus of the load circuit according to the first embodiment of the present invention.

FIG. 9 is a characteristic chart showing a change of an electric wire temperature when a current of 50 [A] is continuously passed to the sample electric wire in which the allowed temperature is 150° C. A curve s13 is a characteristic curve when the conductor resistance r shown in Expression (1) is set at 32.7 [mΩ] equal to the conductor resistance r of this sample electric wire. A curve s14 is a characteristic curve when the conductor resistance r shown in Expression (1) is set at 114.45 [mΩ] equal to the pseudo-conductor resistance r*.

As shown by the curve s13, when the current of 50 [A] is flown through the sample electric wire, the electric wire temperature is saturated at 955.86° C. Moreover, as shown by the curve s14, the first reference electric wire temperature obtained by the pseudo-conductor resistor r* is saturated at 3283.0° C. Here, when the curves s13 and s14 are compared with each other, it is under stood that the curve S13 reaches the saturated temperature of 150° C. at the point of time when approximately 5.25 [sec] elapses from the start of such energization, and meanwhile, that the curve S14 reaches the saturated temperature of 150° C. at the point of time when approximately 1.4 [sec] elapses from the start of the energization.

From the above-described fact, it is understood that, when such a large current that exceeds the allowed temperature of the sample electric wire flows continuously, the first reference electric wire temperature reaches the saturated temperature of 150° C. faster than the actual electric wire temperature.

Hence, from the characteristic charts shown in FIG. 8 and FIG. 9, the following can be concluded. Specifically, the pseudo-conductor resistance r* is used, whereby the circuit can be broken instantaneously when such a large current that exceeds the allowed temperature of the electric wire flows, and the circuit can be broken at an earlier point of time before the electric wire temperature reaches the allowed temperature when the current that approximates to the allowed temperature of the electric wire flows.

The electric wire temperatures T2 are calculated by arithmetic expressions (pseudo-temperature arithmetic expressions) obtained by assigning only the pseudo-heat capacity C* or both of the pseudo-conductor resistance r* and the pseudo-heat capacity C* to Expressions (1) and (2) described above. Then, it is understood that, at the time of heat generation, a time (saturation time) until the electric wire temperature reaches the saturated temperature becomes shorter than the actual saturated temperature. A description is made below, as an example of this fact, the electric wire temperature calculated based on the arithmetic expression, to which both of the pseudo-conductor resistance r* and the pseudo-heat capacity C* are assigned, with reference to characteristic charts shown in FIG. 10 and FIG. 11.

Figure 10:
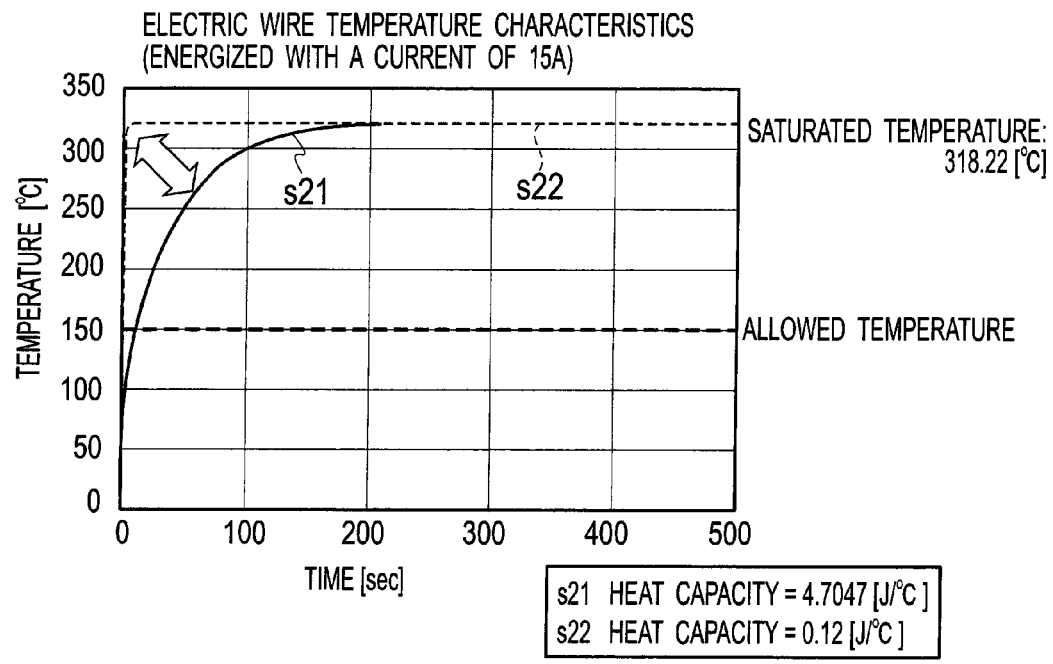
FIG. 10 is an explanatory chart showing current/breaking time characteristics when a heat capacity is changed in the protection apparatus of the load circuit according to the first embodiment of the present invention.

FIG. 10 is a characteristic chart showing a change of an electric wire temperature when the current of 15 [A] is continuously flown through an electric wire in which the allowed temperature is 150° C. (hereinafter, referred to as a sample electric wire). A curve s21 is a characteristic curve when the heat capacity C shown in Expression (1) is set at 4.7047 [J/° C.] equal to the heat capacity C of this sample electric wire. A curve s22 is a characteristic curve when the heat capacity C shown in Expression (1) is set at 0.12 [J/° C.] equal to the pseudo-heat capacity C*.

As shown by the curve s21, when the current of 15 [A] is flown through the sample electric wire, the electric wire temperature is saturated at 318.22° C. This fact is the same as in the curve s12 shown in FIG. 8. As opposed to this, as shown by the curve s22, when the electric wire temperature is calculated by the pseudo-heat capacity C* (hereinafter, this is referred to as a "second reference electric wire temperature), the saturated temperature is 318.22° C. in the same way as in the curve s21, whereas the time (saturation time) until the electric wire temperature reaches the saturated temperature is shortened. Specifically, in the curve s21, the electric wire temperature reaches the saturated temperature of 318.22° C. when approximately 400 [sec] elapses from the start of the energization, and in the curve s22, the electric wire temperature reaches the saturated temperature of 318.22° C. substantially instantaneously after the start of the energization. As a result, in the curve s21, the electric wire temperature reaches the allowed temperature of 150° C. at the point of time when approximately 70 [sec] elapses from the start of the energization, but in the curve s22, the electric wire temperature reaches the allowed temperature of 150° C. substantially instantaneously after the start of the energization.

From the above-described fact, the pseudo-conductor resistance r* and the pseudo-heat capacity C* are used as the conductor resistance r and the heat capacity C, which are used in Expressions (1) and (2), whereby the time required until the second reference electric wire temperature reaches the saturated temperature of the energization current is shortened.

Figure 11:
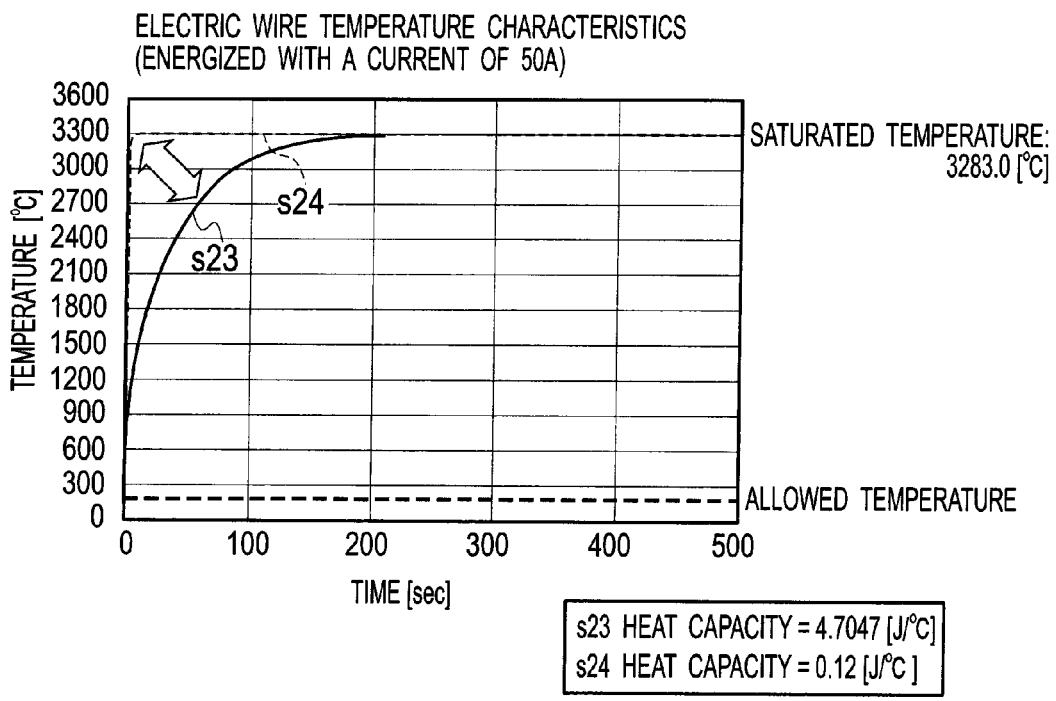
FIG. 11 is an explanatory chart showing current/breaking time characteristics when the heat capacity is changed in the protection apparatus of the load circuit according to the first embodiment of the present invention.

FIG. 11 is a characteristic chart showing a change of an electric wire temperature when the current of 50 [A] is continuously flown through the sample electric wire in which the allowed temperature is 150° C. A curve s23 is a characteristic curve when the heat capacity C shown in Expression (1) is set at 4.7047 [J/° C.] equal to the heat capacity C of this sample electric wire. A curve s24 is a characteristic curve when the heat capacity C shown in Expression (1) is set at 0.12 [J/° C.] equal to the pseudo-heat capacity C*. Note that the above-mentioned pseudo-conductor resistance r* is used as the conductor resistance.

As shown by the curve s23, when the current of 50 [A] is flown through the sample electric wire, the electric wire temperature is saturated at 3283.0° C. As opposed to this, as shown by the curve s24, when the electric wire temperature (second reference electric wire temperature) is estimated by the pseudo-heat capacity C*, the saturated temperature is 3283.0° C. in the same way as in the curve s23, whereas the time until the electric wire temperature reaches the saturated temperature is shortened. Specifically, in the curve s23, the electric wire temperature reaches the saturated temperature of 3283.0° C. when approximately 200 [sec] elapses from the start of the energization, and in the curve s24, the electric wire temperature reaches the saturated temperature of 3283.0° C. substantially instantaneously after the start of the energization.

Moreover, between the curves s23 and s24, the time until the electric wire temperature reaches the allowed temperature of 150° C. is substantially the same. Hence, when the large current flows, the electric wire temperature reaches the allowed temperature substantially instantaneously regardless of the heat capacity.

From the above-described facts, the following is understood. The second reference electric wire temperature estimated by, as the conductor resistance r in Expressions (1) and (2), the pseudo-conductor resistance r* larger than the actual conductor resistance, and by, as the heat capacity C in Expressions (1) and (2), the pseudo-heat capacity C* smaller than the actual heat capacity reaches the allowed temperature while the actual electric wire temperature is being lower than the allowed temperature, and the time until the second reference electric wire temperature reaches the allowed temperature is shorter than that of the actual electric wire temperature. In other words, a pseudo-temperature arithmetic expression using the pseudo-conductor resistance r* and the pseudo-heat capacity C* is created based on Expressions (1) and (2), the electric wire temperature is estimated by this pseudo-temperature arithmetic expression, and the load circuit is broken when this estimated temperature reaches the allowed temperature of the electric wire. Then in the case, the threshold temperature at the time of de-energizing the electric wire becomes a lower temperature than the allowed temperature of the electric wire.

Hence, in this embodiment, by the pseudo-temperature arithmetic expressions in which both of the pseudo-conductor resistor r* and the pseudo-heat capacity C* are assigned to Expressions (1) and (2), the electric wire temperature by the heat generation and the electric wire temperature by the heat radiation are obtained. Then, when the electric wire temperature T2 reaches the allowed temperature of the electric wire as a result of the arithmetic operation using the pseudo-temperature arithmetic expression, the semiconductor relay S1 is broken to protect the circuit. Specifically, when the electric wire temperature T2 reaches the allowed temperature as a result of the arithmetic operation using the pseudo-temperature arithmetic expression, the actual electric wire temperature is lower than the temperature T2. Hence, the circuit can be surely broken before the electric wire temperature reaches the allowed temperature (for example, 150° C.)

With reference to FIG. 4 to FIG. 7, it is described below in detail that it is possible to protect the circuit by estimating the electric wire temperature by the pseudo-temperature arithmetic expressions.

A curve s1 shown in FIG. 4 represents current/breaking time characteristics when the allowed temperature is set at 150° C. Specifically, the curve s1 shows a relationship between the current I1 and the elapsed time t on a right side of the above-mentioned Expression (1) when T2 on a left side thereof is fixed at 150° C. As understood from the curve S1, the electric wire temperature does not reach 150° C., for example, when a current of 20 [A] flows for 10 seconds; however, the electric wire temperature reaches 150° C. when a current of 90 [A] flows for 10 seconds. Specifically, when a current shown in an inside (lower left side in FIG. 4) of the curve s1 flows, the electric wire temperature does not reach 150° C. as the allowed temperature.

Figure 1:
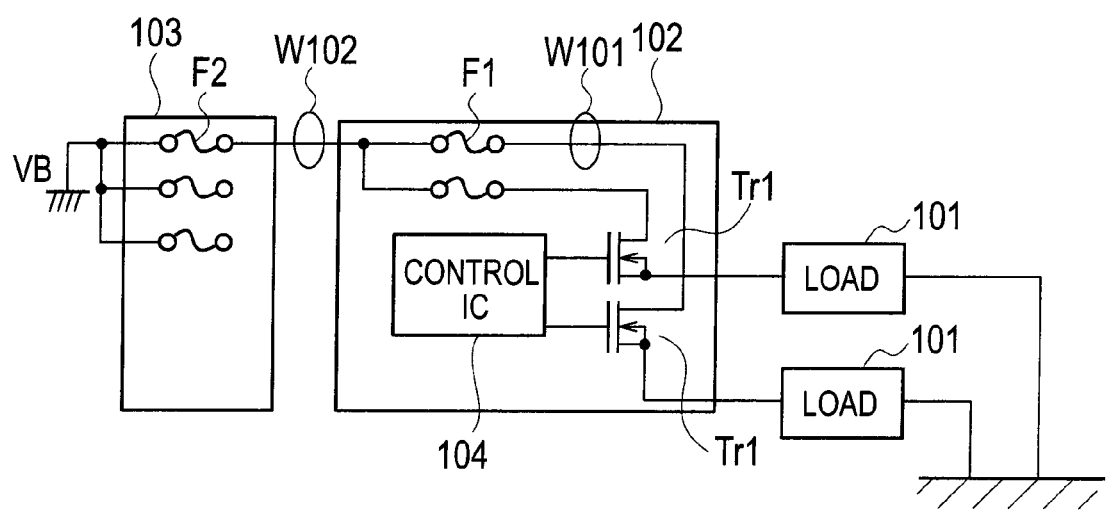
FIG. 1 is a circuit diagram showing a configuration of a protection apparatus of a load circuit in a conventional example.

Moreover, curves s2 and s3 are current/breaking time characteristic curves of a fuse with a general standard, which is provided upstream of the electric wire in which the allowed temperature is set at 150° C. Here, the curve s2 shows a maximum value (MAX) of such current/breaking time characteristics, and the curve s3 shows a minimum value (MIN) thereof. Specifically, when a current of a value within a range between the curves s2 and s3 flows through this fuse, the fuse is broken (blown), and protects the circuit. Hence, by this fuse, the circuit can be surely broken at the point of time before the electric wire temperature reaches 150° C. Hence, if the switch circuit 16 shown in FIG. 1 and FIG. 2 has current/breaking time characteristics between the curves s2 and s3, then characteristics of the conventional fuse can be simulated.

Moreover, a curve s4 shows load characteristics. The curve s4 is plotted in an inside (lower left side) of the curves s2 and s3 showing the current/breaking time characteristics of the fuse, and accordingly, the fuse is not broken by a current flowing through the load at the time of a usual operation.

FIG. 5 is a characteristic chart in which a curve s5 is added to FIG. 4. The curve s5 shows current/breaking time characteristics when the conductor resistance r of the above-mentioned electric wire is changed to the pseudo-conductor resistance r* and when the allowed temperature of the electric wire is set at 150° C. Specifically, the curve s5 shows current/breaking time characteristics when the conductor resistance is changed from the actual conductor resistance r equal to 32.7 [mΩ] in the electric wire from the pseudo-conductor resistance r* equal to 114.45 [mΩ]. As illustrated, in a low current region, the curve s5 has current/breaking time characteristics located between the maximum value and minimum value of the current/breaking time characteristics of the fuse. Specifically, in the low current region, the curve s5 becomes a curve passing through a region located between the curves s2 and s3, and it can be said that the curve s5 has characteristics simulating the fuse.

Figure 6:
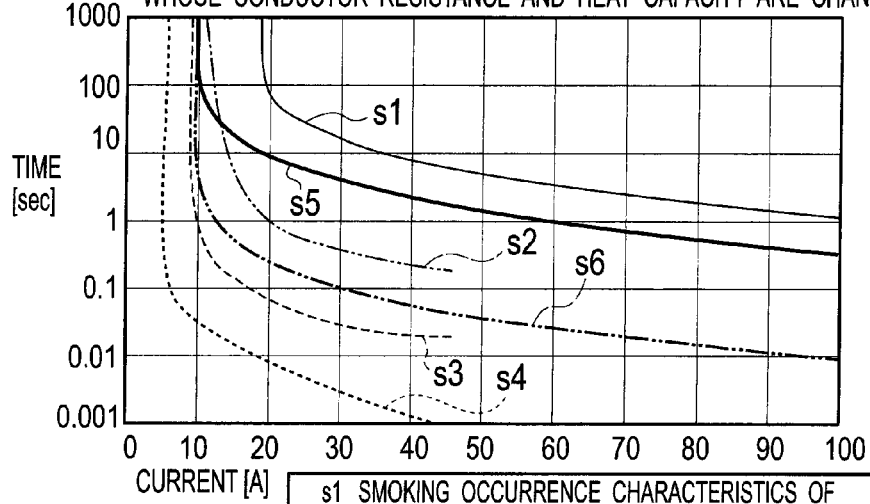
FIG. 6 is an explanatory chart showing current/breaking time characteristics in the protection apparatus of the load circuit according to the embodiment of the present invention.

FIG. 6 is a characteristic chart in which a curve s6 is added to FIG. 5. The curve s6 shows current/breaking time characteristics when the heat capacity C is changed to the pseudo-heat capacity C* and when the allowed temperature of the electric wire is set at 150° C. in addition to the above-mentioned change of the conductor resistance to the pseudo-conductor resistance r*. Specifically, the curve s6 shows current/breaking time characteristics when the heat capacity is changed from the actual heat capacity C equal to 4.7047 [J/° C.] in the electric wire to the pseudo-heat capacity C* equal to 0.12 [J/° C.]. As understood from the curve s6 in FIG. 6, in the case of using both of the pseudo-conductor resistance r* and the pseudo-heat capacity C*, the current/breaking time characteristics thereof are current/breaking time characteristics located between the maximum value and minimum value of the current/breaking time characteristics of the fuse. In other words, the curve s6 becomes a curve passing through a region located between the curves s2 and s3 in the whole of the current region, and characteristics simulating the conventional fuse can be obtained by the current/breaking time characteristics concerned.

Hence, in the protection apparatus of the load circuit according to this embodiment, the electric wire temperature is estimated by each of the pseudo-temperature arithmetic expressions in which the conductor resistance r and the heat capacity C in Expressions (1) and (2) are changed to the pseudo-conductor resistance r* and the pseudo-heat capacity C*, respectively, whereby it becomes possible to break the circuit based on the current/breaking time characteristics simulating the fuse.

Figure 7:
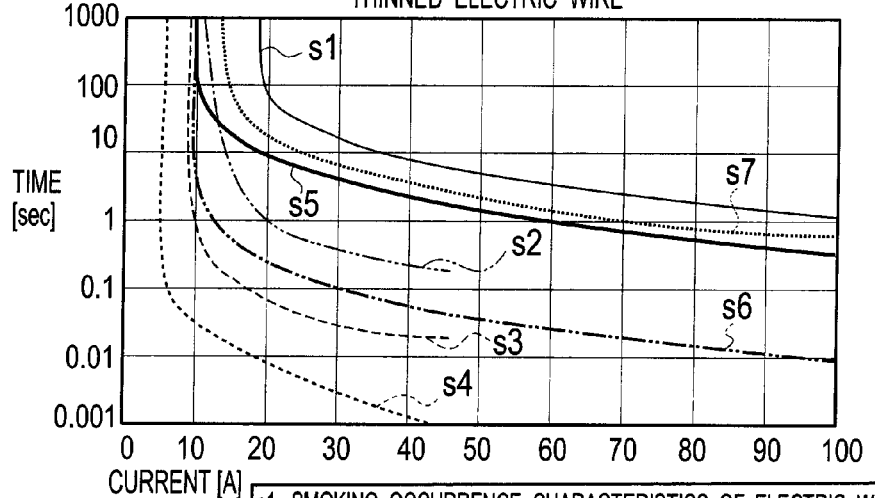
FIG. 7 is an explanatory chart showing current/breaking time characteristics in the protection apparatus of the load circuit according to the embodiment of the present invention.

FIG. 7 shows that a diameter of the electric wire can be reduced more than heretofore since it is possible to break the switch circuit 16 based on the current/breaking time characteristics shown by the above-described curve s6. Specifically, by the switch circuit 16 having the current/breaking time characteristics as shown by the curve s6, the electric wire can be changed from such an electric wire having the allowed temperature shown by the curve s1 to such an electric wire having a much lower allowed temperature shown by the curve s7. Specifically, in the protection apparatus of the load circuit according to this embodiment, the diameter of the electric wire can be reduced even by the switch circuit 16 having the current/breaking time characteristics equivalent to those of the conventional fuse.

Next, a description is made of a calculation procedure of the electric wire temperature at the time of heat generation in accordance with the above-mentioned Expression (1) and a calculation procedure of the electric wire temperature at the time of heat radiation in accordance with the above-mentioned Expression (2) by Patterns 1 to 6 shown in FIG. 12 to FIG. 17.

[Pattern 1]

FIG. 12(*a*) is a characteristic chart showing a temperature change of the electric wire when the electric wire temperature is saturated at a constant current (40 [A]), and the current is thereafter broken to radiate heat. FIG. 12(*b*) is an explanatory view showing states of the change. Now, it is assumed that an initial temperature of the electric wire is T0 as the ambient temperature (state P1). Thereafter, when the current of 40 [A] flows through the electric wire, the electric wire temperature gradually rises from the temperature T0 (state P2), and reaches T40max as the saturated temperature at the current of 40 [A] at a time t1. Specifically, T0 is assigned to the ambient temperature T1 on the right side of the above-mentioned Expression (1), 40 [A] is assigned to the current I1 on the right side concerned, and t1 is assigned to the time t on the right side. Then, the estimated temperature T2 of the electric wire owing to the heat generation rises along a curve shown by FIG. 12(*a*), and reaches the saturated temperature T40max at the time t1.

Next, when the current is broken, the current value I2 saturated at the electric wire temperature T40max at this time when the current is broken is reversely calculated (state P3). As a result, the current value I2 is obtained as 40 [A]. Then, the ambient temperature is assigned to T1 shown in Expression (2), and the obtained current value I2 and elapsed time t are further assigned to the corresponding items in Expression (2), whereby the estimated temperature T2 of the electric wire owing to the heat radiation is obtained (state P4).

Specifically, when the current is broken after the current of 40 [A] flows through the electric wire and the temperature of the electric wire reaches the saturated temperature T40max at this current 40 [A], 40 [A] is assigned to the current I2 shown in the right side of Expression (2), whereby the electric wire temperature at the time of heat radiation is obtained.

[Pattern 2]

FIG. 13(*a*) is a characteristic chart showing a temperature change of the electric wire when the electric wire temperature rises at a constant current (40 [A]), and in a transient state before the electric wire temperature reaches the saturated temperature T40max, the current is broken to radiate the heat. FIG. 13(*b*) is an explanatory view showing states of the change. Now, it is assumed that an initial temperature of the electric wire is T0 as the ambient temperature (state P11). Thereafter, when the current of 40 [A] flows through the electric wire, the electric wire temperature gradually rises from the temperature T0 (state P12). Then, when current passage of 40 [A] is interrupted at a time tx, that is, when the current is broken before the electric wire temperature reaches the saturated temperature T40max by the passage of 40 [A], a temperature Tx by the heat generation at this time is obtained, and the current value I2 at which this temperature Tx becomes the saturated temperature is reversely calculated (state P13). For example, when the electric wire temperature Tx at the time tx is a saturated temperature T30max when a current of 30 [A] flows, 30 [A] is assigned to the current I2 on the right side of Expression (2), and the ambient temperature is further assigned to T1 on the right side, and the elapsed time is further assigned to t on the right side, whereby the estimated temperature T2 of the electric wire owing to the heat radiation is obtained (state P14).

Specifically, when the current of 40 [A] flows, and the current is broken before the electric wire temperature reaches the saturated temperature T40max at the current of 40 [A], the current saturated at the temperature when the current is broken is obtained. Then, this current is assigned to the corresponding item on the right side of Expression (2), whereby the electric wire temperature in the case of radiating the heat is obtained.

[Pattern 3]

FIG. 14(*a*) is a characteristic chart showing a temperature change of the electric wire when the electric wire temperature reaches the saturated temperature by a first current (for example, 30 [A]), and the electric wire temperature further reaches the saturated temperature by a second current (for example, 40 [A]) larger than the first current. FIG. 14(*b*) is an explanatory view showing states of the change. Now, it is assumed that an initial temperature of the electric wire is T0 as the ambient temperature (state P21). Thereafter, when the current of 30 [A] flows through the electric wire, the electric wire temperature Tx gradually rises from the temperature T0 (state P22), and reaches the saturated temperature T30max at the time t1 (state P23).

When the current is changed to 40 [a] in this state, an elapsed time t3 in the case of assuming that the electric wire temperature reaches T30max as a result of that the current of 40 [A] flows from the beginning is reversely calculated (state P24). Then, 40 [A] is assigned to the current I1 on the right side of Expression (1), and the above-described t3 is assigned to the time t, and the estimated temperature T2 until the time elapses to the time t2 is obtained (state P22 one more time). Then, at the time t2, the electric wire temperature reaches the saturated temperature T40max at the current of 40 [A] (state P25).

Specifically, when the current of 30 [A] flows, the electric wire temperature reaches the saturated temperature T30max at the current of 30 [A], and thereafter, the current is changed to 40 [A], then the elapsed time in the case of assuming that the current of 40 [A] flows from the beginning, that is, the time t3 shown in FIG. 14(*a*) is calculated. Then, the time t3 is assigned to the corresponding item of Expression (1), and the electric wire temperature is obtained.

[Pattern 4]

FIG. 15(*a*) is a characteristic chart showing a temperature change of the electric wire when the electric wire temperature rises by the first current (for example, 30 [A]), the first current is changed to the second current (for example, 40 [A]) larger than the first current before the electric wire temperature reaches the saturated temperature T30max by the first current, and the electric wire temperature reaches the saturated temperature T40max at the second current. Moreover, FIG. 15(*b*) is an explanatory view showing states of the change. Now, it is assumed that an initial temperature of the electric wire is T0 as the ambient temperature (state P31). Thereafter, when the current of 30 [A] flows through the electric wire, the electric wire temperature Tx gradually rises from the temperature T0 (state P32). Then, when the current is changed to 40 [A] when the electric wire temperature reaches Tx at the time tx, the elapsed time t3 in the case of assuming that the current of 40 [A] flows from the beginning and the electric wire temperature reaches Tx is reversely calculated (state P33). Then, 40 [A] is assigned to the current I1 on the right side of Expression (1), and the above-described t3 is assigned to the time t on the right side, and the estimated temperature T2 until the time elapses to the time t2 is obtained (state P32 one more time).

Then, at the time t2, the electric wire temperature reaches the saturated temperature T40max at the current of 40 [A] (state P34).

Specifically, when the current is changed to 40 [A] at the point of time when the electric wire temperature reaches the temperature Tx before reaching the saturated temperature at the current of 30 [A] as a result of that the current of 30 [A] flows, the elapsed time in the case of assuming that the current of 40 [A] flows from the beginning, that is, the time t3 shown in FIG. 15(a) is calculated. Then, the time t3 is assigned to the corresponding item of Expression (1), and the electric wire temperature is obtained.

[Pattern 5]

FIG. 16(a) is a characteristic chart showing a temperature change of the electric wire when the electric wire temperature reaches the saturated temperature T40max at the first current (for example, 40 [A]) by the first current concerned, and the electric wire temperature further drops to the saturated temperature T30max at the second current (for example, 30 [A]) smaller than the first current by the second current concerned. FIG. 16(b) is an explanatory view showing state of the change. Now, it is assumed that an initial temperature of the electric wire is T0 as the ambient temperature (state P41). Thereafter, when the current of 40 [A] flows through the electric wire, the electric wire temperature Tx gradually rises from the temperature T0 (state P42), and reaches the saturated temperature T40max at the time t1 (state P43).

When the current is changed to 30 [A] in this state, a difference $\Delta T$ ($\Delta T = T40max - T30max$) between the saturated temperature T40max at the current of 40 [A] and the saturated temperature T30max at the current of 30 [A] is obtained. Then, the current value I2 saturated at this difference temperature $\Delta T$ is calculated from Expression (1) (state P44). As a result, for example, when the current value I2 becomes equal to 7.5 [A], 7.5 [A] is assigned to I2 on the right side of Expression (2), and the saturated temperature T30max at the current of 30 [A] is assigned to the temperature T1 on the right side, whereby the estimated temperature T2 of the electric wire owing to the heat radiation is obtained (state P45). Thereafter, after the elapse of the time t2, the electric wire temperature reaches the saturated temperature T30max of the time when the current of 30 [A] flows (state P46).

Specifically, when the current of 40 [A] flows, the electric wire temperature reaches the saturated temperature T40max at the current of 40 [A], and thereafter, the current is changed to 30 [A], then the difference $\Delta T$ between the respective saturated temperatures is obtained, and the current value I2 saturated at this difference temperature $\Delta T$ is calculated. Then, this current value I2 and the saturated temperature T30max are assigned to the corresponding items of Expression (2), whereby the electric wire temperature is obtained.

[Pattern 6]

FIG. 17(a) is a characteristic chart showing a temperature change of the electric wire when, when the electric wire temperature rises by the first current (for example, 40 [A]) to then reach the temperature Tx before reaching the saturated temperature T40max at the first current, the first current is changed to the second current (for example, 30 [A]) smaller than the first current, and the electric wire temperature drops to reach the saturated temperature T30max at the second current. FIG. 17(b) is an explanatory view showing states of the change. Now, it is assumed that an initial temperature of the electric wire is T0 as the ambient temperature (state P51). When the current of 40 [A] flows through the electric wire, the electric wire temperature Tx gradually rises from the temperature T0 (state P52). Then, when the current is changed to 30 [A] when the electric wire temperature reaches Tx at the time tx, a difference $\Delta T$ ($\Delta T = Tx - T30max$) between the temperature Tx and the saturated temperature T30max of the time when the current of 30 [A] flows is obtained, and the current value I2 saturated at this difference temperature $\Delta T$ is calculated (state P53). As a result, for example, when the current value I2 becomes equal to 5 [A], the current of 5 [A] is assigned to I2 on the right side of Expression (2), and the saturated temperature T30max at the current of 30 [A] is assigned to the temperature T1 on the right side, whereby the estimated temperature T2 of the electric wire owing to the heat radiation is obtained (state P54). Thereafter, after the elapse of the time t2, the electric wire temperature reaches the saturated temperature T30max of the time when the electric wire is energized with the current of 30 [A] (state P55).

Specifically, when the current is changed to 30 [A] at the point of time when the electric wire temperature reaches the temperature Tx before reaching the saturated temperature T40max at the current of 40 [A] as a result of that the current of 40 [A] flows, the difference $\Delta T$ between the temperature Tx and the saturated temperature T30max of the time when the electric wire is energized with the current of 30 [A] is calculated, and the current value I2 saturated at this difference temperature $\Delta T$ is calculated. Then, this current value I2 and the saturated temperature T30max are assigned to the corresponding items of Expression (2), whereby the electric wire temperature is obtained.

Figure 18:
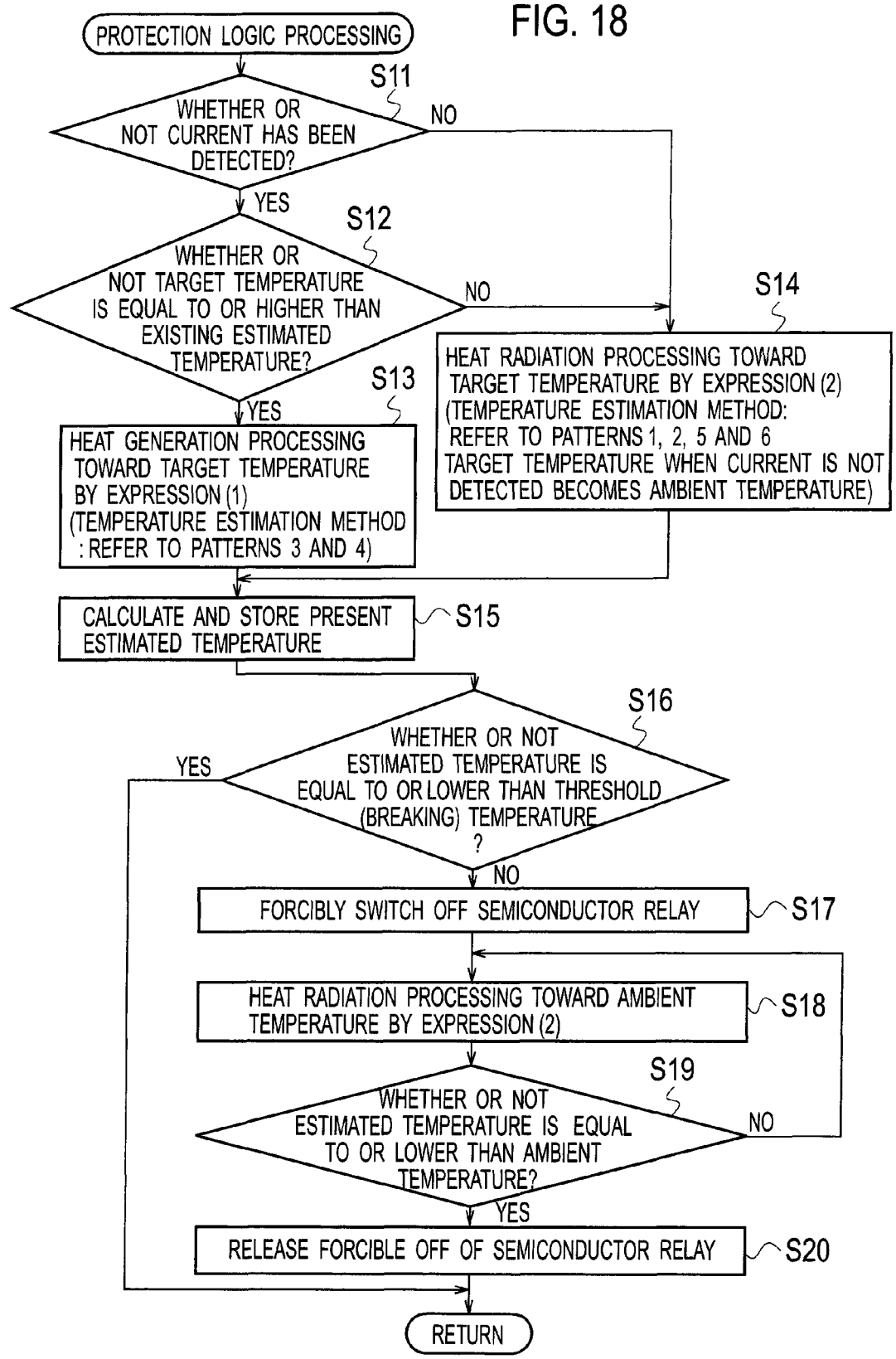
FIG. 18 is a flowchart showing processing operations of the protection apparatus of the load circuit according to the first embodiment of the present invention.

Next, a description is made of processing operations of the protection apparatus of the load circuit according to this embodiment with reference to a flowchart shown in FIG. 18. Note that a series of processings shown in FIG. 18 are executed repeatedly in a predetermined sampling cycle.

First, in processing of Step S11, the control circuit 161 of the switch circuit 16 shown in FIG. 3 determines whether or not the current is detected by the ammeter 163. Specifically, the control circuit 161 determines whether or not the current is flowing through the loads 11 shown in FIG. 2. Then, in the case of having determined that the current is flowing through the loads 11 (YES in Step S11), the processings proceed to Step S12. Meanwhile, in the case of having determined that the current is not flowing through the loads 11 (NO in Step S11), the processings proceed to Step S14.

In Step S12, the control circuit 161 determines whether or not a target temperature (saturated temperature when a present current continues to flow) of the present current is equal to or higher than the present estimated temperature (estimated temperature at the time of the previous sampling). Then, in the case of having determined that the target temperature is equal to or higher than the present estimated temperature (YES in Step S12), the processings proceed to Step S13 since the heat generation at the time of the previous sampling or more occurs. Meanwhile, in the case of having determined that the target temperature is lower than the present estimated temperature (NO in Step S12), the processings proceed to Step S14 since the heat radiation occurs.

In Step S13, the control circuit 161 executes heat generation processing toward the target temperature by Expression (1) (expression using the pseudo-conductor resistance r* and the pseudo-heat capacity C*). In this heat generation processing, processings using the temperature estimation methods shown in the above-mentioned Patterns 3 and 4 (that is, calculation of the time t3, and the like) are executed. When this processing is ended, the processings proceed to Step S15.

In Step S14, the control circuit 161 executes heat radiation processing toward the target temperature by Expression (2) (expression using the pseudo-conductor resistance r* and the pseudo-heat capacity C*). In this heat radiation processing, processings using the temperature estimation methods shown in the above-mentioned Patterns 1, 2, 5 and 6 (that is, calculation of the difference temperature, and the like) are executed. Moreover, the ambient temperature is defined as the target temperature when the current is not detected. When this processing is ended, the processings proceed to Step S15.

In Step S15, the control circuit 161 calculates the present estimated temperature of the electric wire W1 based on results of the processings of Steps S13 and S14. Moreover, the calculated estimated temperature is stored in a memory (not shown) and the like. When this processing is ended, the processings proceed to Step S16.

In Step S16, the control circuit 161 determines whether or not the estimated temperature calculated in the processing of Step S15 is equal to or lower than a set protection temperature. The set protection temperature is a temperature obtained by the curve s6 in FIG. 6. Then, when the estimated temperature is equal to or lower than the set protection temperature (YES in Step S16), the processings return to Step S11. Meanwhile, when the estimated temperature is not equal to or lower than the set protection temperature (NO in Step S16), the processings proceed to Step S17.

In Step S17, the control circuit 161 forcibly switches OFF the semiconductor relay S1 shown in FIG. 3. Specifically, when the estimated temperature of the electric wire is equal to or higher than the threshold temperature, the control circuit 161 breaks the semiconductor relay S1, and protects the circuit. When this processing is ended, the processings proceed to Step S18.

In Step S18, the control circuit 161 executes heat radiation processing in which the ambient temperature is defined as the target temperature by Expression (2). Specifically, even when the semiconductor relay S1 is switched OFF, the electric wire W1 radiates the heat, and accordingly, a heat radiation temperature in this case is obtained. When this processing is ended, the processings proceed to Step S19.

In Step S19, the control circuit 161 determines whether or not the estimated temperature has dropped to the ambient temperature or lower. Then, when the estimated temperature has dropped to the ambient temperature or lower (YES in Step S19), the processings proceed to Step S20. Meanwhile, when the estimated temperature has not dropped to the ambient temperature or lower (NO in Step S19), the processings return to Step S18.

In Step S20, the control circuit 161 releases such forcible OFF of the semiconductor relay S1. Specifically, when the estimated temperature of the electric wire W1 has dropped to the ambient temperature or lower, no problem occurs even if the current is flown through the electric wire W1 one more time. Accordingly, the forcible OFF of the semiconductor relay S1 is released. When this processing is ended, the processings return to Step S11.

As described above, in the protection apparatus of the load circuit according to this embodiment, the temperature of the electric wire W1 is estimated by, as Expressions (1) and (2), the arithmetic expressions (pseudo-temperature arithmetic expressions) using the pseudo-conductor resistance r* and the pseudo-heat capacity C*. Then, when this estimated temperature has reached the allowed temperature (for example, 150° C.) of the electric wire, the control circuit 161 breaks the semiconductor relay S1, and thereby protects the load circuit. Hence, at the point of time before the actual temperature of the electric wire W1 reaches the allowed temperature (for example, 150° C.) as a result of that the overcurrent flowed through the loads 11, the circuit can be surely broken, and the electric wire W1 and the load 11 provided downstream thereof can be protected. Therefore, it is not necessary to use the conventional fuses.

Moreover, unlike the conventional fuses, no deterioration occurs owing to the rush currents and the repetition of the ON/OFF of the loads, and it is not necessary to ensure the margin for the breaking temperature. Therefore, the diameter of the electric wire can be reduced, and the miniaturization and weight reduction of the electric wire can be achieved. Furthermore, an effect of improving fuel consumption can be eventually exerted.

Second Embodiment

A description is made below of a second embodiment of the present invention based on the drawings.

Figure 19:
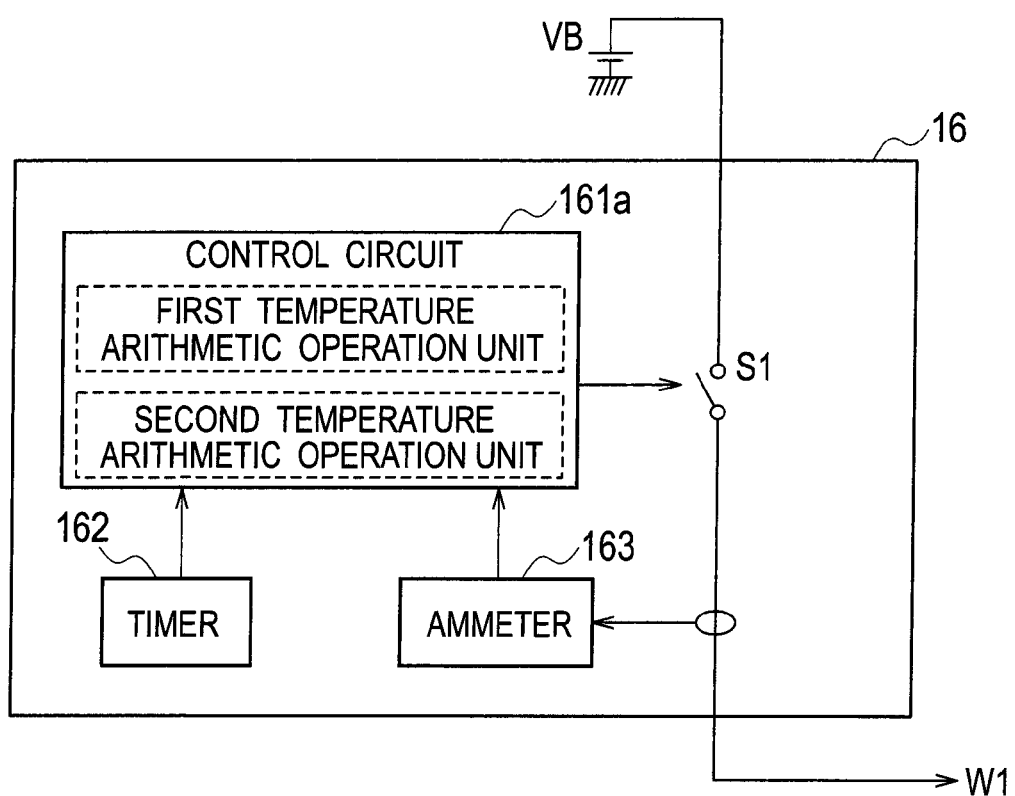
FIG. 19 is a block diagram showing a configuration of a switch circuit in a processing apparatus of a load circuit according to a second embodiment of the present invention.

FIG. 19 is a block diagram showing a detailed configuration of each of switch circuits 16 according to the second embodiment of the present invention. As shown in FIG. 19, each of the switch circuits 16 includes: the semiconductor relay (switch portion) S1; the ammeter 163 that detects the current flowing through the electric wire W1; the timer 162 that counts the elapsed time while the current is flowing through the electric wire W1; and a control circuit 161a that controls ON/OFF of the semiconductor relay S1 based on the current detected by the ammeter 163 and on the time counted by the timer 162. The control circuit 161a includes functions as a first temperature arithmetic operation unit, a second temperature arithmetic operation unit and an overcurrent determination unit, which is described later.

The control circuit 161a estimates the virtual temperature of the electric wire W1 (not the actual temperature of the electric wire W1 but the temperature defined by the pseudo-temperature arithmetic expression) by a first temperature arithmetic operation method and a second temperature arithmetic operation method, which is described later. When the virtual temperature reaches the preset allowed temperature (temperature at which the electric wire W1 causes smoking owing to overheating, for example, 600° C. or 500° C., the control circuit 161a breaks the current, which flows through the electric wire W1, by the electronic switch S1, and protects the electronic wire W1, and the respective electronic switches Tr1 and the respective loads 11, which are provided downstream of the electronic wire W1 concerned.

The electric wire temperature at the time of heat generation and the electric wire temperature at the time of heat radiation are calculated based on Expressions (1) and (2) shown in the first embodiment. Expressions (1) and (2) are shown below one more time.

$$T2=T1+I1^2 rR\{1-\exp[-t/(C \cdot R)]\} \qquad (1)$$

$$T2=T1+I2^2 rR\{\exp[-t/(C \cdot R)]\} \qquad (2)$$

Definitions of the respective variables in the expressions are as mentioned above, and a description thereof is omitted.

A description is made below of the first temperature arithmetic operation method and the second temperature arithmetic operation method according to the second embodiment.

[First Temperature Arithmetic Operation Method]

If the heat capacity C is changed to a value smaller than the actual value in the above-described Expressions (1) and (2), then the time required until the estimated temperature T2 reaches the saturated temperature is shortened.

FIG. 20 is a characteristic chart showing a change of the electric wire temperature when the current of 50 [A] is continuously flown through an electric wire in which the allowed temperature is 150° C. (hereinafter, referred to as a sample electric wire). A curve s31 is a characteristic curve when the heat capacity C shown in Expression (1) is set at 4.7047 [J/°

C.] equal to the actual heat capacity C of this sample electric wire. A curve s32 is a characteristic curve when the heat capacity C shown in Expression (1) is set at 0.12 [J/° C.] equal to the pseudo-heat capacity C* (specifically, C*<C).

As shown by the curve s31, when the current of 50 [A] is flown through the sample electric wire, the electric wire temperature is saturated at 786° C. As opposed to this, as shown by the curve s32, when the electric wire temperature is calculated by the first pseudo-heat capacity C*, the saturated temperature is 786° C. in the same way as in the curve s31, whereas the time (saturation time) until the electric wire temperature reaches the saturated temperature is shortened. Specifically, in the curve s31, the electric wire temperature reaches the saturated temperature of 786° C. when approximately 170 [sec] elapses from the start of the energization, and in the curve s32, the electric wire temperature reaches the saturated temperature of 786° C. substantially instantaneously after the start of the energization. As a result, in the curve s31, the electric wire temperature reaches 150° C. as the allowed temperature at the point of time when approximately 6.4 [sec] elapses from the start of the energization, but in the curve s32, the electric wire temperature reaches 150° C. as the allowed temperature at the point of time when approximately 0.2 [sec] elapses from the start of the energization.

Moreover, it is understood that, if the allowed temperature of the electric wire is changed to 60° C. (first allowed temperature), then the electric wire temperature reaches this allowed temperature (60° C.) at the point of time when approximately 1.67 [sec] elapses from the start of the energization in the curve s31, and the electric wire temperature reaches the allowed temperature (60° C.) at the point of time when approximately 0.036 [sec] elapses from the start of the energization in the curve s32.

Hence, the heat capacity C for use in Expressions (1) and (2) is changed to the first heat capacity C*, whereby the time required until the electric wire temperature reaches the saturated temperature is shortened, and further, the time required until the electric wire temperature reaches the allowed temperature is also shortened.

In this embodiment, expressions in which the heat capacity C for use in the above-described Expressions (1) and (2) is changed to the first pseudo-heat capacity C*, that is, the following Expressions (1a) and (2a) are set.

$$T2 = T1 + I1^2 rR\{1 - \exp[-t/(C^* \cdot R)]\} \quad (1a)$$

$$T2 = T1 + I2^2 rR\{\exp[-t/(C^* \cdot R)]\} \quad (2a)$$

(C*=0.12 [J/° C.])

Here, Expression (1a) is a first pseudo-heat generation temperature arithmetic expression, and Expression (2a) is a first pseudo-heat radiation temperature arithmetic expression.

Then, in the first temperature arithmetic operation method, the electric wire temperature is estimated by the above-described Expressions (1a) and (2a). It is understood that, by these expressions, the estimated temperature of the sample electric wire reaches the allowed temperature (60° C.) faster than the actual electric wire temperature.

In other words, if the electric wire temperature is estimated by Pseudo-temperature arithmetic expressions (1a) and (2a) which use the first pseudo-heat capacity C*, and the load circuit is broken when this estimated temperature reaches the allowed temperature (for example, 60° C.) of the electric wire, then the load circuit can be broken based on characteristics of a curve s9 in FIG. 24, which is described later. Note that a reason why the allowed temperature is set at 60° C. is described later.

[Second Temperature Arithmetic Operation Method]

FIG. 21 is a characteristic chart showing a change of the electric wire temperature when the current of 50 [A] is continuously flown through the sample electric wire in which the allowed temperature is 150° C. A curve s33 is a characteristic curve when the heat capacity C shown in Expression (1) is set at 4.7047 [J/° C.] equal to the actual heat capacity C of this sample electric wire (specifically, the curve s33 is similar to the curve s31 in FIG. 20). A curve s34 is a characteristic curve when the heat capacity C shown in Expression (1) is set at a second pseudo-heat capacity C** equal to 0.02 [J/° C.].

As shown by the curve s33, when the current of 50 [A] is flown through the sample electric wire, the electric wire temperature is saturated at 786° C. As opposed to this, as shown by the curve s34, when the electric wire temperature is calculated by the second pseudo-heat capacity C**, the saturated temperature is 786° C. in the same way as in the curve s33, whereas the time until the electric wire temperature reaches the saturated temperature is shortened. Specifically, in the curve s33, the electric wire temperature reaches the saturated temperature of 786° C. when approximately 170 [sec] elapses from the start of the energization, and in the curve s34, the electric wire temperature reaches the saturated temperature of 786° C. substantially instantaneously after the start of the energization. Moreover, an inclination of the curve s34 becomes larger than that of the curve s32 shown in FIG. 20.

As a result, in the curve s33, the electric wire temperature reaches 150° C. as the allowed temperature at the point of time when approximately 6.4 [sec] elapses from the start of the energization, but in the curve s32, the electric wire temperature reaches 150° C. as the allowed temperature at the point of time when approximately 0.026 [sec] elapses from the start of the energization.

Moreover, it is understood that, if the allowed temperature is changed to 500° C. (second allowed temperature), then the electric wire temperature reaches 500° C. as the allowed temperature at the point of time when approximately 34.6 [sec] elapses from the start of the energization in the curve s33, and the electric wire temperature reaches 500° C. as the allowed temperature at the point of time when approximately 0.28 [sec] elapses from the start of the energization in the curve s34.

From the above-described facts, it is understood that the estimated temperature of the sample electric wire reaches the allowed temperature (500° C.) faster than the actual electric wire temperature by the following Expressions (1b) and (2b) in which the heat capacity in Expressions (1) and (2) is changed to the second pseudo-heat capacity C** (<C*) smaller than the actual heat capacity C.

$$T2 = T1 + I1^2 rR\{1 - \exp[-t/(C^{**} \cdot R)]\} \quad (1b)$$

$$T2 = T1 + I2^2 rR\{\exp[-t/(C^{**} \cdot R)]\} \quad (2b)$$

(C*=0.12 [J/° C.])

Here, Expression (1b) is a second pseudo-heat generation temperature arithmetic expression, and Expression (2b) is a second pseudo-heat radiation temperature arithmetic expression.

In other words, if the electric wire temperature is estimated by Expressions (1b) and (2b) which use the second pseudo-heat capacity C*, and the load circuit is broken when this estimated temperature reaches the allowed temperature (for example, 500° C.) of the electric wire, then the load circuit can be broken based on characteristics of a curve s12 in FIG. 28, which is described later. Note that a reason why the allowed temperature is set at 500° C. is described later.

A description is made below of procedures of setting the above-described Expressions (1a) and (2a) and Expressions (1b) and (2b).

Figure 22:
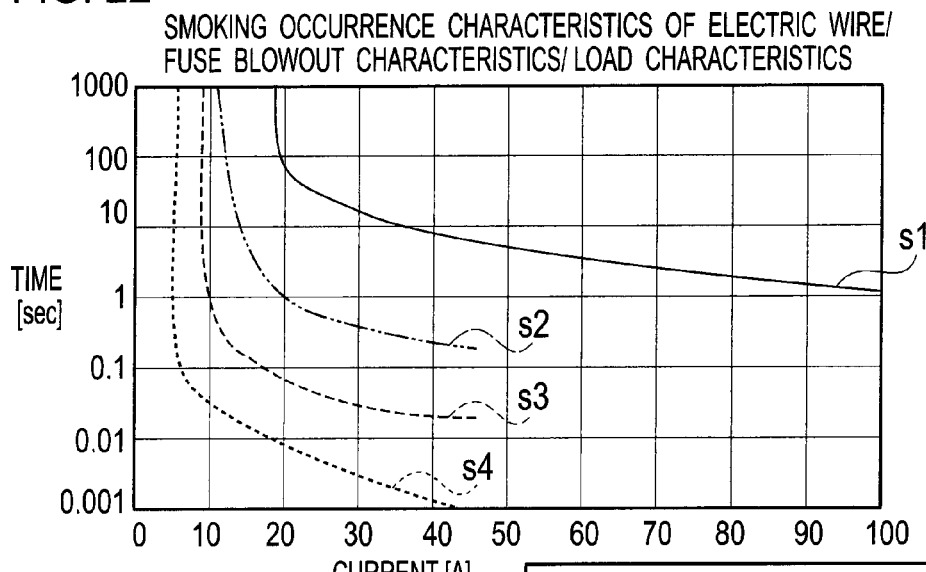
FIG. 22 is an explanatory chart showing current/breaking time characteristics in the protection apparatus of the load circuit according to the second embodiment of the present invention.

First, as mentioned in the first embodiment, when a current shown in an inside (lower left side in FIG. 22) of a curve s1 shown in FIG. 22 flows, the electric wire temperature does not reach 150° C. as the allowed temperature. Moreover, if the switch circuits 16 shown in FIG. 2 and FIG. 19 have current/breaking time characteristics located between curves s2 and s3 shown in FIG. 22, then the switch circuits 16 can simulate the characteristics of the conventional fuse. Furthermore, a curve s4 is plotted in an inside (lower left side) of the curves s2 and s3 showing the current/breaking time characteristics of the fuse, and accordingly, the fuse is not broken by a current flowing through the load at the time of a usual operation.

Figure 23:
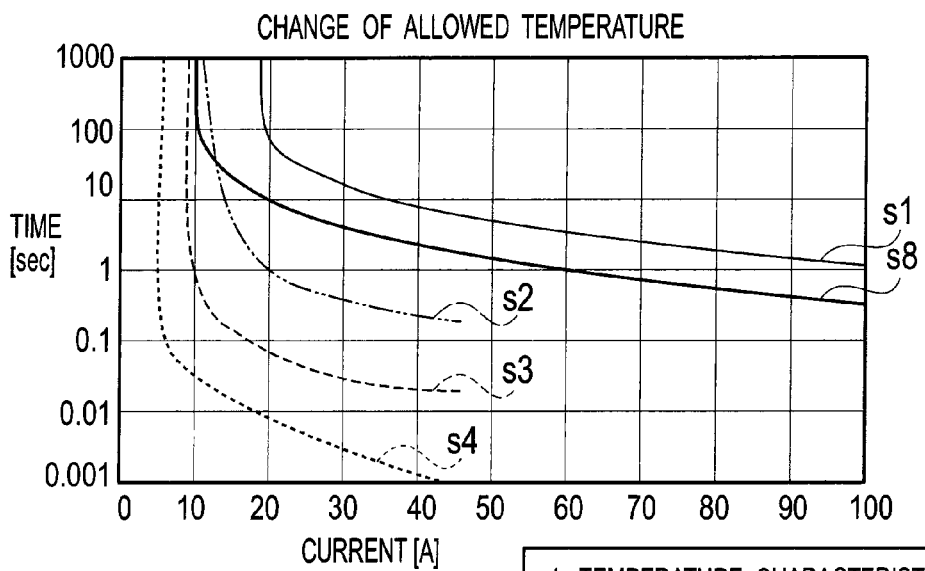
FIG. 23 is an explanatory chart showing current/breaking time characteristics in the protection apparatus of the load circuit according to the second embodiment of the present invention.

FIG. 23 is a characteristic chart in which a curve s8 is added to FIG. 22. The curve s8 shows current/breaking time characteristics when the allowed temperature is set at 60° C. The curve s8 has characteristics in which the curve s1 moves in the lower left direction, and shows that the electric wire temperature reaches 60° C. as the allowed temperature by a smaller current. Moreover, in the curve s8, the maximum continuous energization current (approximately 10 [A]) thereof substantially coincides with the characteristics of the fuse. Specifically, currents on left ends of the curves s2 and s3 and a current on a left end of the curve s8 substantially coincide with each other. In other words, the allowed temperature is set at 60° C., whereby the current/breaking time characteristics of the electric wire can be matched with the currents on the left ends of the fuse characteristics.

Figure 24:
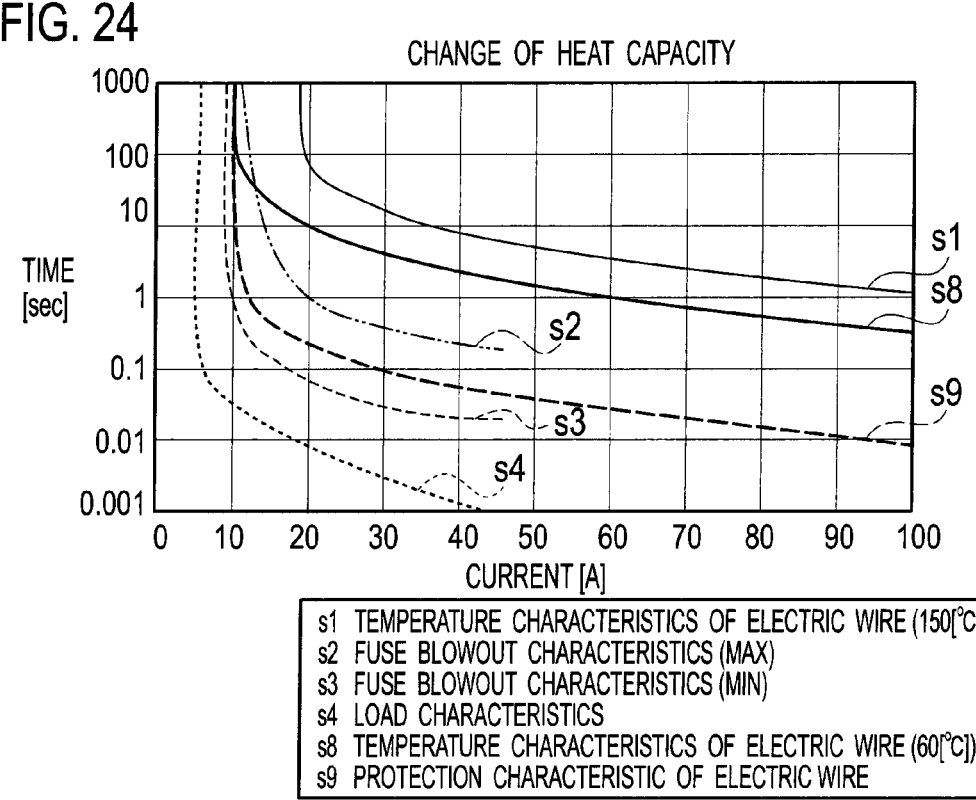
FIG. 24 is an explanatory chart showing current/breaking time characteristics in the protection apparatus of the load circuit according to the second embodiment of the present invention.

Moreover, in the above-described Expressions (1) and (2), the heat capacity C is changed to the first pseudo-heat capacity C* equal to 0.12 [J/° C.], whereby the curve s8 becomes a curve having current/breaking time characteristics passing between the curves s2 and s3 as shown by a curve s9 in FIG. 24.

Specifically, the heat capacity C in Expressions (1) and (2) is changed to C* equal to 0.12 [J/° C.], the electric wire temperature is estimated by Expressions (1a) and (2a) thus changed, and the electronic switch S1 (refer to FIG. 19) is broken when the estimated temperature reaches 60° C. Then in this case, characteristics substantially equivalent to those of the conventional fuse can be obtained. Note that, needless to say, the estimated temperature in this case is not the actual electric wire temperature, but the pseudo temperature decided by the first temperature arithmetic operation method.

Figure 25:
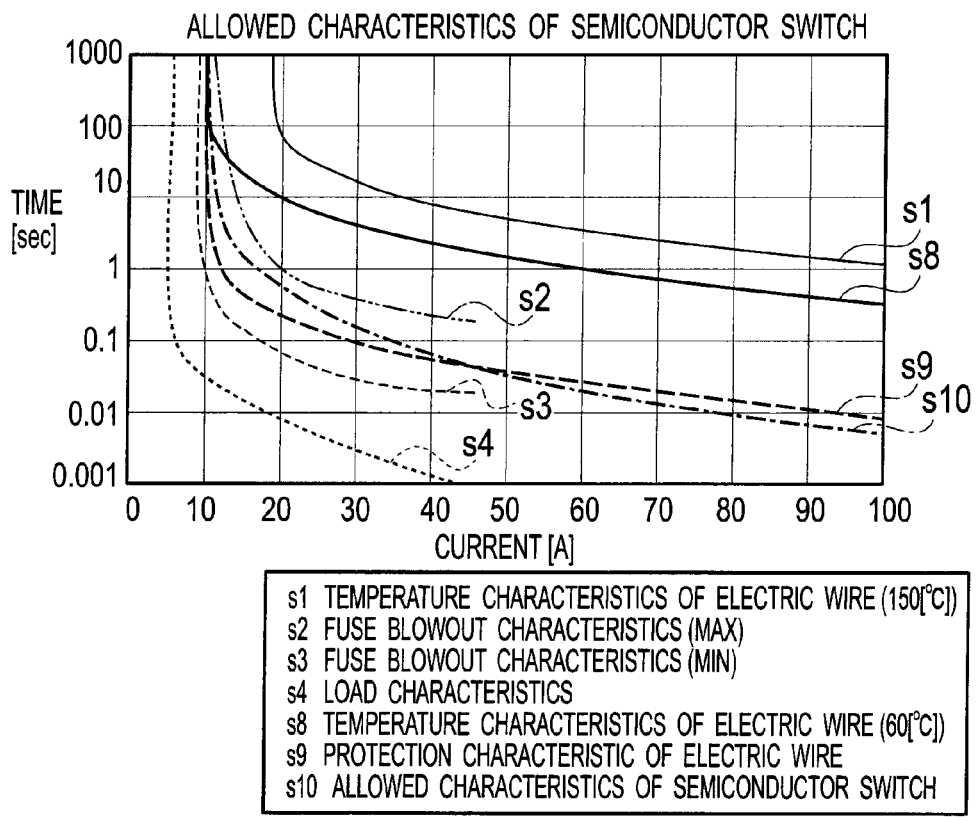
FIG. 25 is an explanatory chart showing current/breaking time characteristics in the protection apparatus of the load circuit according to the second embodiment of the present invention.

FIG. 25 is a characteristic chart into which a curve s10 showing allowed characteristics of the electronic switch Tr1 shown in FIG. 2 is written. When a current in a region (upper right region of the curve s10) exceeding the curve s10 flows, then the electronic switch Tr1 is damaged by the heat generation. Note that, as understood from FIG. 25, the curve s10 and the curve s9 intersect each other at a current of approximately 45 [A]. Specifically, in a region where the current becomes 45 [A] or higher, the allowed characteristics of the electronic switch Tr1 fall down below the curve s9 showing the current/breaking time characteristics in which the allowed temperature is set at 60° C. This stands for that the electronic switch Tr1 cannot be protected when the current exceeds 45 [A].

Figure 26:
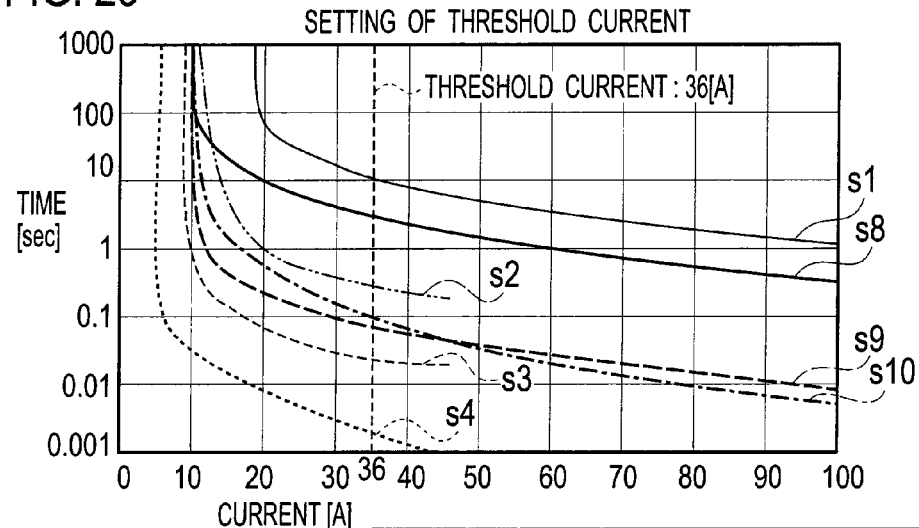
FIG. 26 is an explanatory chart showing current/breaking time characteristics in the protection apparatus of the load circuit according to the second embodiment of the present invention.

Hence, in the region where the current becomes 45 [A] or higher, an arithmetic expression provided with current/breaking time characteristics lower than the allowed characteristic curve s10 of the electronic switch Tr1 becomes necessary. Accordingly, in this embodiment, as shown in FIG. 26, temperature characteristics of the electronic switch Tr1 and variations such as a detection error of the current are considered. For example, the variations are set at 20%, and 36 [A] as a current lower by 20% than the current of 45 [A] is set as a threshold current (predetermined threshold current). Moreover, an arithmetic expression for protecting the electronic switch Tr1 is set by a curve showing current/breaking time characteristics in which the allowed temperature is set at 500° C. as shown below.

Figure 27:
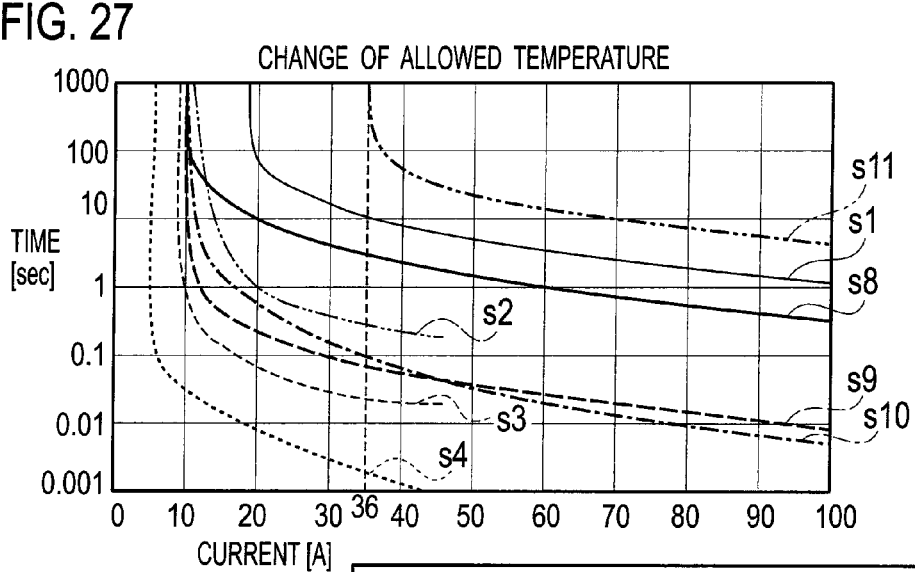
FIG. 27 is an explanatory chart showing current/breaking time characteristics in the protection apparatus of the load circuit according to the second embodiment of the present invention.

FIG. 27 is a characteristic chart into which a curve s11 showing current/breaking time characteristics in which the allowed temperature is set at 500° C. is written. In this curve s11, the maximum energizable current at the time of the continuous energization becomes approximately 36 [A]. Specifically, a left of the curve s11 is located at 36 [A] as the above-described threshold current. In other words, an allowed temperature of an electric wire having current/breaking time characteristics in which a left-end current becomes 36 [A] is 500° C.

FIG. 28 shows a curve s12 having current/breaking time characteristics when the heat capacity of the curve s11 shown in FIG. 27 is changed. In the above-described Expressions (1) and (2), the heat capacity C is changed to the second pseudo-heat capacity C** equal to 0.02 [J/° C.], whereby, as shown by the curve s12, the curve s11 becomes a curve having current/breaking time characteristics somewhat falling down below the curve s10.

Specifically, the heat capacity C in Expressions (1) and (2) is changed to C** equal to 0.02 [J/° C.], the electric wire temperature is estimated by Expressions (1b) and (2b) thus changed, and the electronic switch S1 is broken when the estimated temperature reaches 500° C. Then in this case, the electronic switch Tr1 can be protected in the region where the current becomes 36 [A] or higher. Note that, needless to say, the estimated temperature in this case is not the actual electric wire temperature, but the pseudo temperature decided by the second temperature arithmetic operation method.

From the above-described facts, it is understood that both of the electric wire W1 and the electronic switches Tr1 can be protected from the heat generation if the overcurrent is determined by Expressions (1a) and (2a) in the region where the current is lower than 36 [A], and by Expressions (1b) and (2b) in the region where the current is 36 [A] or higher.

FIG. 29 shows that the electric wire diameter can be reduced more than heretofore since it is possible to break the load circuit based on the current/breaking time characteristics shown by the above-described curve s9 or s12. Specifically, the electric wire shown by the curve s1, in which the allowed temperature is 150° C., can be changed, for example, to the electric wire having characteristics of the curve s13 lower in allowed temperature than that of the electric wire concerned.

Note that patterns for a calculation procedure of the electric wire temperature at the time of heat generation in accordance with the above-mentioned Expressions (1a) and (1b) and a calculation procedure of the electric wire temperature at the time of heat radiation in accordance with the above-mentioned Expressions (2a) and (2b) are the same as the six patterns (refer to FIG. 12 to FIG. 17) mentioned in the first embodiment, and accordingly, a description thereof is omitted.

Figure 30:
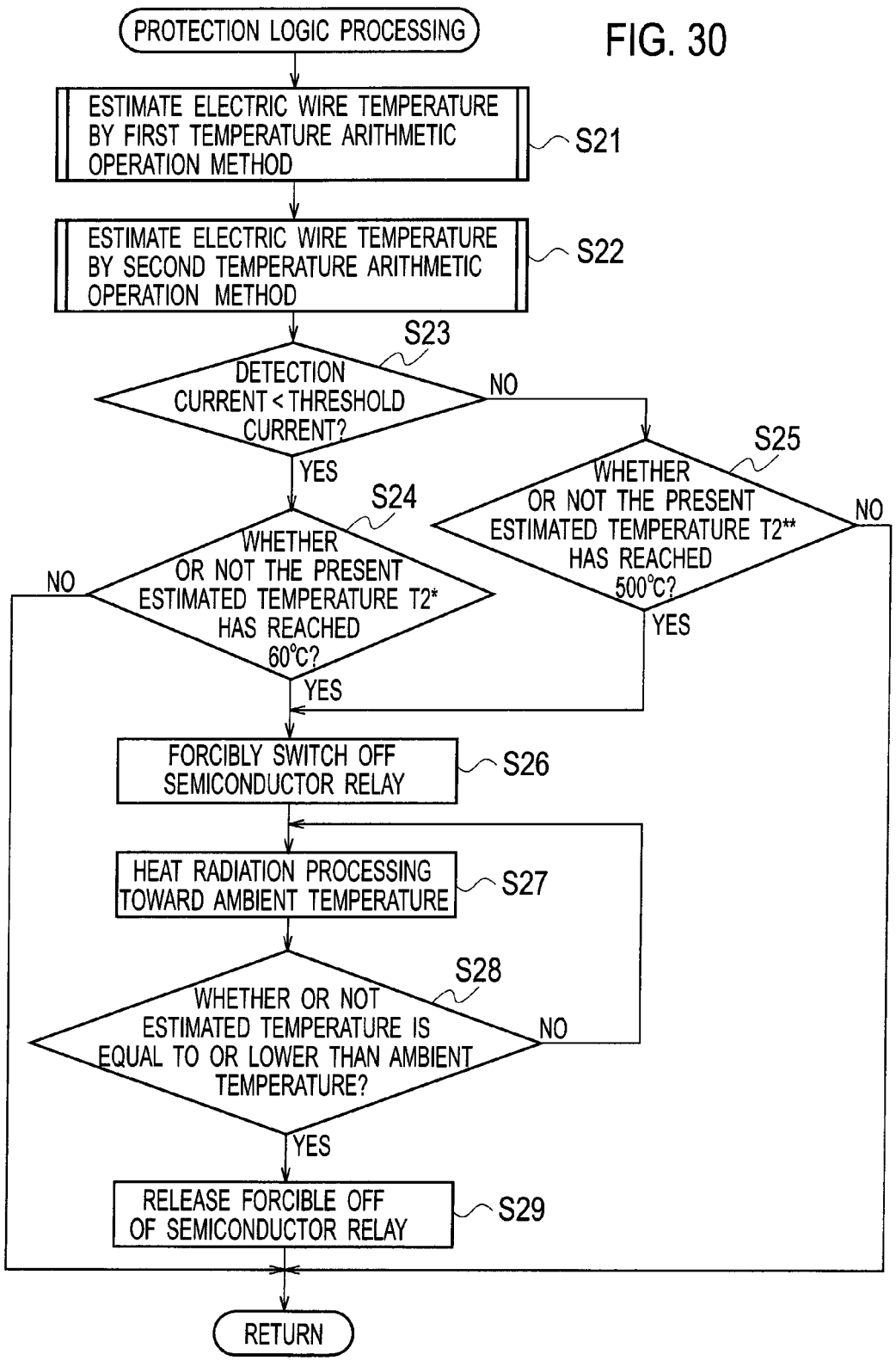
FIG. 30 is a flowchart showing processing operations of the protection apparatus of the load circuit according to the second embodiment of the present invention.
Figure 31:
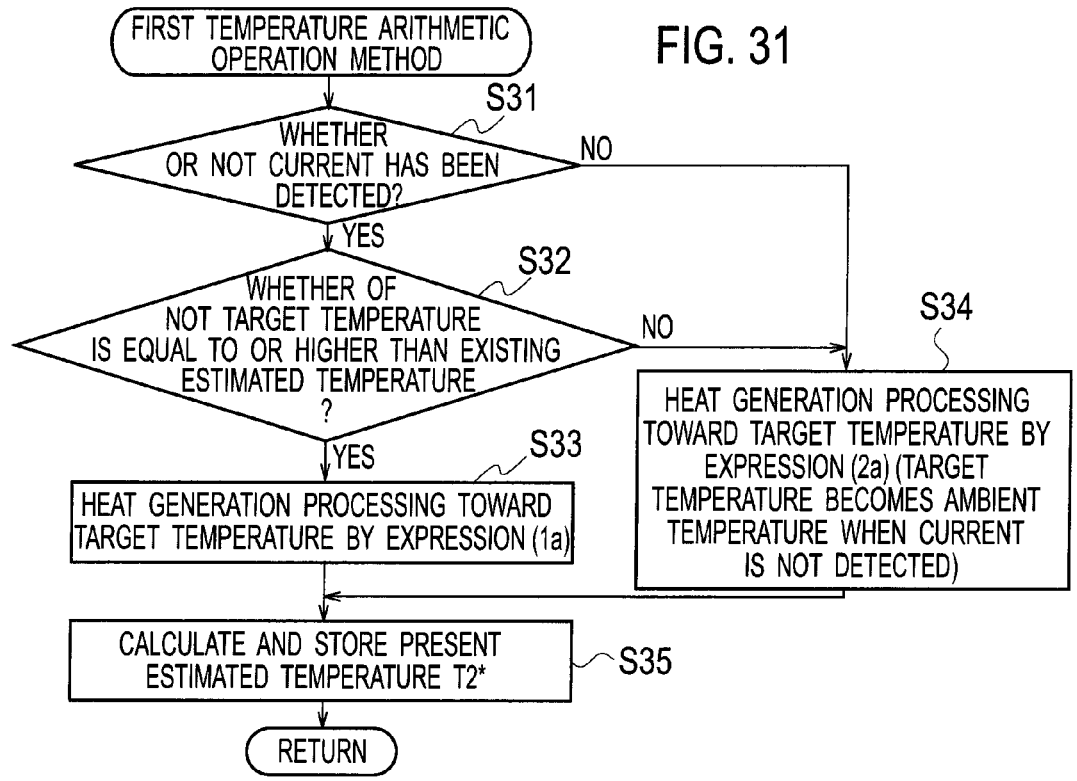
FIG. 31 is a flowchart showing processing operations of a first temperature arithmetic operation method in the protection apparatus of the load circuit according to the second embodiment of the present invention.
Figure 32:
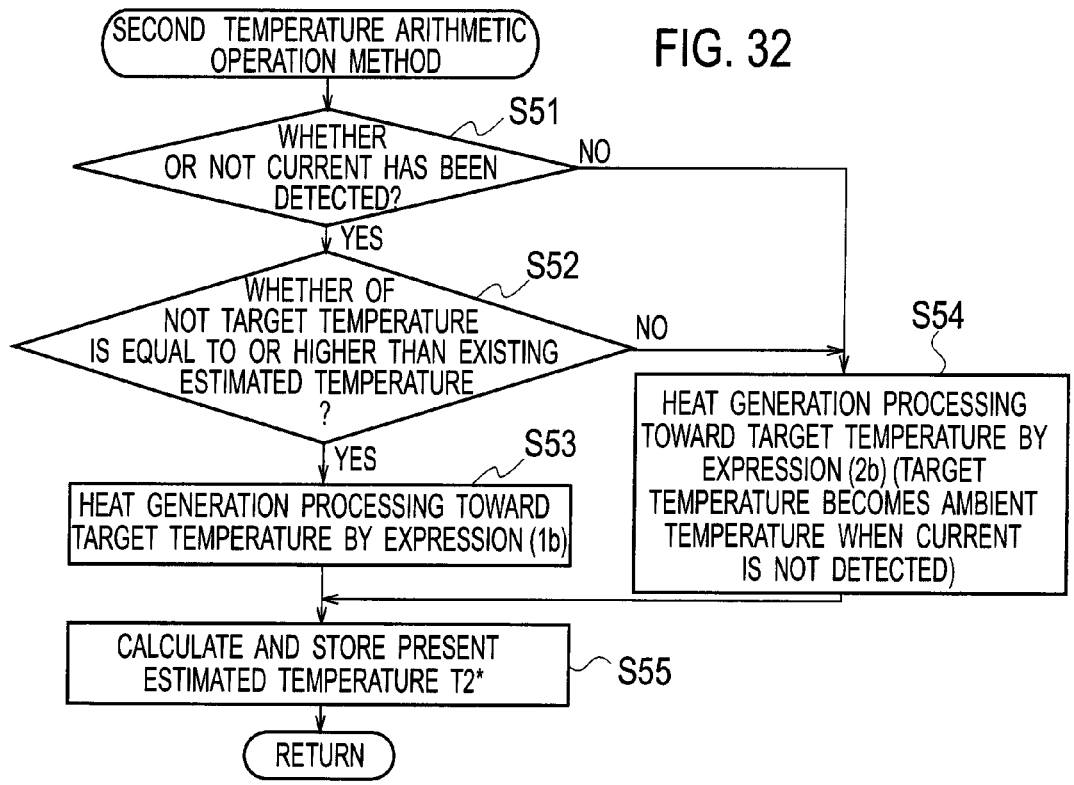
FIG. 32 is a flowchart showing processing operations of a second temperature arithmetic operation method in the protection apparatus of the load circuit according to the second embodiment of the present invention.

Next, a description is made of processing operations of the protection apparatus of the load circuit according to this embodiment with reference to flowcharts shown in FIG. 30 to FIG. 32. Note that a series of processings shown in FIG. 30 to FIG. 32 are executed repeatedly in a predetermined sampling cycle.

First, in Step S21 of FIG. 30, the control circuit 161a of the switch circuit 16 shown in FIG. 19 estimates the electric wire temperature by the first temperature arithmetic operation method. In this processing, the control circuit 161a implements an arithmetic operation of a heat generation amount or a heat radiation amount based on the current detected by the ammeter 163, and thereby obtains the present electric wire temperature. A description is made later of a detailed processing procedure with reference to FIG. 31.

In Step S22, the control circuit 161a estimates the electric wire temperature by the second temperature arithmetic operation method. In this processing, the control circuit 161a implements an arithmetic operation of a heat generation amount or a heat radiation amount based on the current detected by the ammeter 163, and thereby obtains the present electric wire temperature. A description is made later of a detailed processing procedure with reference to FIG. 32.

A description is made below of the estimation processing for the electric wire temperature by the first temperature arithmetic operation method shown in Step S21 with reference to the flowchart shown in FIG. 31.

In Step S31 of FIG. 31, the control circuit 161a determines whether or not the current is detected by the ammeter 163. Specifically, the control circuit 161a determines whether or not the current is flowing through the loads 11 shown in FIG. 2. Then, in the case of having determined that the current is flowing through the loads 11 (YES in Step S31), the processings proceed to Step S32. Meanwhile, in the case of having determined that the current is not flowing through the loads 11 (NO in Step S31), the processings proceed to Step S34.

In Step S32, the control circuit 161a determines whether or not a target temperature (saturated temperature when a present current continues to flow) of the present current is equal to or higher than the present estimated temperature (estimated temperature at the time of the previous sampling). Then, in the case of having determined that the target temperature is equal to or higher than the present estimated temperature (YES in Step S32), the processings proceed to Step S33 since the heat generation at the time of the previous sampling or more occurs. Meanwhile, in the case of having determined that the target temperature is lower than the present estimated temperature (NO in Step S32), the processings proceed to Step S34 since the heat radiation occurs.

In Step S33, the control circuit 161a executes heat generation processing toward the target temperature by Expression (1a) (expression using the first pseudo-heat capacity $C^*$). In this heat generation processing, processings using the temperature estimation methods shown in the above-mentioned Patterns 3 and 4 (that is, calculation of the time t3, and the like) are executed. When this processing is ended, the processings proceed to Step S35.

In Step S34, the control circuit 161a executes heat radiation processing toward the target temperature by Expression (2a) (expression using the first pseudo-heat capacity $C^*$). In this heat radiation processing, processings using the temperature estimation methods shown in the above-mentioned Patterns 1, 2, 5 and 6 (that is, calculation of the difference temperature, and the like) are executed. Moreover, the ambient temperature (for example, 25° C.) is defined as the target temperature when the current is not detected. When this processing is ended, the processings proceed to Step S35.

In Step S35, the control circuit 161a calculates the present estimated temperature $T2^*$ of the electric wire W1 based on results of the processings of Steps S33 and S34. Moreover, the calculated estimated temperature is stored in the memory (not shown) and the like. When this processing is ended, the processings proceed to Step S22 of FIG. 30.

Next, a description is made below of the estimation processing for the electric wire temperature by the second temperature arithmetic operation method shown in Step S22 of FIG. 30 with reference to the flowchart shown in FIG. 32.

In Step S51 of FIG. 32, the control circuit 161a determines whether or not the current is detected by the ammeter 163. Specifically, the control circuit 161a determines whether or not the current is flowing through the loads 11 shown in FIG. 2. Then, in the case of having determined that the current is flowing through the loads 11 (YES in Step S51), the processings proceed to Step S52. Meanwhile, in the case of having determined that the current is not flowing through the loads 11 (NO in Step S51), the processings proceed to Step S54.

In Step S52, the control circuit 161a determines whether or not the target temperature (saturated temperature when the present current continues to flow) of the present current is equal to or higher than the present estimated temperature (estimated temperature at the time of the previous sampling). Then, in the case of having determined that the target temperature is equal to or higher than the present estimated temperature (YES in Step S52), the processings proceed to Step S53 since the heat generation at the time of the previous sampling or more occurs. Meanwhile, in the case of not having determined that the target temperature is equal to or higher than the estimated temperature (NO in Step S52), the processings proceed to Step S54 since the heat radiation occurs.

In Step S53, the control circuit 161a executes the above-mentioned heat generation processing toward the target temperature by Expression (1b) (expression using the second pseudo-heat capacity $C^{**}$). When this processing is ended, the processings proceed to Step S55.

In Step S54, the control circuit 161a executes the above-mentioned heat radiation processing toward the target temperature by Expression (2b) (expression using the second pseudo-heat capacity $C^{**}$). Moreover, the ambient temperature (for example, 25° C.) is defined as the target temperature when the current is not detected. When this processing is ended, the processings proceed to Step S55.

In Step S55, the control circuit 161a calculates the present estimated temperature $T2^{**}$ of the electric wire W1 based on the temperatures obtained by the processings of Step S53 and S54. Moreover, the calculated estimated temperature is stored in the memory (not shown) and the like. When this processing is ended, the processings proceed to Step S23 of FIG. 30.

In Step S23 of FIG. 30, the control circuit 161a determines whether or not the current detected by the ammeter 163 is lower than the threshold current or equal to or higher than the threshold current. As mentioned above, in this processing, the threshold current is set at 36 [A], and this threshold current and the detected current are compared with each other. When the detected current is lower than the threshold current (YES in Step S23), the processings proceed to Step S24. Meanwhile, when the detected current is equal to or higher than the threshold current (NO in Step S23), the processings proceed to Step S25.

In Step S24, the control circuit 161a determines whether or not the present estimated temperature $T2^*$ obtained by the processing of Step S35 of FIG. 31 has reached 60° C. as the first allowed temperature. Then, when the present estimated temperature $T2^*$ has reached 60° C. (YES in Step S24), the processings proceed to Step S26, and when the present estimated temperature $T2^*$ has not reached 60° C. (NO in Step S24), the processings return to Step S21.

In Step S25, the control circuit 161a determines whether or not the present estimated temperature $T2^{}$ obtained by the processing of Step S55 of FIG. 31 has reached 500° C. as the second allowed temperature. Then, when the present estimated temperature $T2^{}$ has reached 500° C. (YES in Step S25), the processings proceed to Step S26, and when the present estimated temperature T2** has not reached 500° C. (NO in Step S25), the processings return to Step S21.

In Step S26, the control circuit 161*a* forcibly switches OFF the electronic switch S1. Specifically, when the detected current is lower than 36 [A] as the threshold current, the control circuit 161*a* forcibly switches OFF the electronic switch S1 by the estimation result of the electric wire temperature, which is based on the first temperature arithmetic operation method, when this estimated temperature has reached 60° C. Specifically, the control circuit 161*a* breaks the load circuit when the current in the region equal to or higher than the curve s9 of FIG. 24 has flown. Meanwhile, when the detected current is equal to or higher than 36 [A] as the threshold current, the control circuit 161*a* forcibly switches OFF the electronic switch S1 by the estimation result of the electric wire temperature, which is based on the second temperature arithmetic operation method, when this estimated temperature has reached 500° C. Specifically, the control circuit 161*a* breaks the load circuit when the current in the region equal to or higher than the curve s12 of FIG. 28 has flown. As a result, both of the electric wire W1 and the electronic switches Tr1 can be protected from the overheating.

In Step S27, the control circuit 161*a* executes the heat radiation processing toward the ambient temperature. In this processing, the electronic switch S1 is switched OFF, whereby the electric wire temperature is subjected to the heat radiation toward 25° C. as the ambient temperature. Hence, in the first temperature arithmetic operation method, the heat radiation processing is performed in accordance with Expression (2a), and in the second temperature arithmetic operation method, the heat radiation processing is performed in accordance with Expression (2b).

In Step S28, the control circuit 161*a* determines whether or not both of the estimated temperature of the electric wire, which is obtained by the first temperature arithmetic operation method, and the estimated temperature of the electric wire, which is obtained by the second temperature arithmetic operation method, have dropped to the ambient temperature or lower.

When the estimated temperatures of the electric wire have dropped to the ambient temperature or lower, the control circuit 161*a* releases such forcible OFF of the electronic switch S1 since no problem occurs even if the current is flown through the load circuit one more time. Specifically, the electronic switch S1 is switched ON, it is made possible to supply the electric power to each of the loads 11 by switching ON the electronic switch S1, and the current can be flown through the load circuit by switching ON each of the electronic switches Tr1.

As described above, in the protection apparatus of the load circuit according to this embodiment, the current detected by the ammeter 163 and the threshold current (for example, 36 [A]) are compared with each other. Then, when the detected current is lower than the threshold current, the estimated temperature of the electric wire W1, which is obtained by the first temperature arithmetic operation method, is used, and the load circuit is broken when the estimated temperature concerned has reached 60° C. set as the first allowed temperature. Meanwhile, when the detected current is equal to or higher than the threshold current, the estimated temperature of the electric wire W1, which is obtained by the second temperature arithmetic operation method, is used, and the load circuit is broken when the estimated temperature concerned has reached 500° C. set as the second allowed temperature.

Hence, both of the electric wire W1 and the electronic switches Tr1, which are used in the load circuit, can be protected from the overheating, and the load circuit can be surely protected without using the fuses used heretofore.

Moreover, as understood from the respective embodiments, in accordance with the present invention, unlike the conventional fuses, no deterioration occurs owing to the rush currents and the repetition of the ON/OFF of the loads, and it is not necessary to ensure the margin for the breaking temperature. Hence, the diameter of the electric wire can be reduced, and the miniaturization and weight reduction of the electric wire can be achieved. Furthermore, an effect of improving fuel consumption can be exerted.

Moreover, for the conventional fuses, fixed currents such as 5 [A], 7.5 [A], 10 [A], 15 [A] and 20 [A] have been set. However, in the protection apparatus of the load circuit according to this embodiment, arbitrary currents (for example, 6 [A], 12.5 [A] and the like) can be set by appropriately setting the first pseudo-heat capacity C*, the second pseudo-heat capacity C** and the allowed temperature. Therefore, the protection apparatus can be made to work on the reduction of the diameter of the electric wire.

Furthermore, since the temperature estimation methods are used, the protection apparatus can be applied not only to a load circuit having a configuration in which one fuse is provided with respect to one load, but also to a system in which a plurality of loads branched downstream, and to a load circuit in which the ON/OFF of the load is performed at random timing.

The description has been made above of the protection apparatus of the load circuit according to the present invention based on the illustrated embodiments. However, the present invention is not limited to these, and the configurations of the respective portions can be substituted by those with arbitrary configurations having similar functions. For example, though the description has been made of the embodiments, for example, by taking as an example the load circuit mounted on the vehicle, the present invention is not limited to this, and can also be applied to other load circuits.

INDUSTRIAL APPLICABILITY

The protection apparatus of the load circuit is extremely useful for protecting the electric wire, the electronic switches and the like without using the fuses for use in the load circuit.

The invention claimed is:
1. A protection apparatus of a load circuit, comprising:
   a timer configured to count an elapsed time of a current flowing through a load via an electric wire;
   a current detection unit configured to detect the current;
   a switch portion configured to switch supply and interruption of the current;
   a temperature estimation unit configured to estimate a temperature of the electric wire based on a pseudo-temperature arithmetic expression; and
   a breaking control unit configured to break the switch portion when the temperature estimated by the temperature estimation unit has reached an allowed temperature of the electric wire,
   wherein the pseudo-temperature arithmetic expression is set in such a manner that, in a temperature arithmetic expression of the electric wire, the temperature arithmetic expression using the elapsed time counted by the timer, the current detected by the current detection unit, and a heat capacity and conductor resistance of the electric wire, a pseudo-heat capacity smaller than the heat capacity of the electric wire is assigned to the heat capac- ity, and a pseudo-conductor resistance larger than the conductor resistance of the electric wire is assigned to the conductor resistance.

2. The protection apparatus of a load circuit according to claim 1, wherein the breaking control unit is further configured to turn the switch portion to a connection-enabled state when the temperature estimated by the temperature estimation unit has dropped to an ambient temperature or lower after the switch portion was broken.

3. The protection apparatus of a load circuit according to claim 1, wherein the pseudo-conductor resistance and the pseudo-heat capacity are set so that current/breaking time characteristics of the electric wire, which are based on the pseudo-temperature arithmetic expression, can be lower than current/breaking time characteristics of an electric wire smaller in diameter than the electric wire for use in the load circuit.

4. The protection apparatus of a load circuit according to claim 1, wherein the pseudo-conductor resistance and the pseudo-heat capacity are set so that current/breaking time characteristics which are based on the pseudo-temperature arithmetic expression can be located between minimum current/breaking time characteristics of a fuse protecting the electric wire and maximum current/breaking time characteristics of the fuse.

5. The protection apparatus of a load circuit according to claim 1, wherein the temperature arithmetic expression of the electric wire is:

$$T2 = T1 + I1^2 rR\{1 - \exp[-t/(C \cdot R)]\} \quad (1)$$

$$T2 = T1 + I2^2 rR\{\exp[-t/(C \cdot R)]\} \quad (2)$$

in which Expression (1) is a temperature arithmetic expression at a time of heat generation, and Expression (2) is a temperature arithmetic expression at a time of heat radiation, where T1 is an ambient temperature [° C.], T2 is an estimated temperature [° C.] of the electric wire, I1 and I2 are energization currents [A], r is an electric wire conductor resistance [Ω], R is a thermal resistance [° C./W], C is a heat capacity [J/° C.], and t is a time [sec].

6. A protection apparatus of a load circuit, comprising:
a timer configured to count an elapsed time of a current flowing through a load via an electric wire;
a current detection unit configured to detect the current;
a first temperature arithmetic operation unit configured to estimate a temperature of the electric wire based on a first pseudo-heat generation temperature arithmetic expression and a first pseudo-heat radiation temperature arithmetic expression;
a second temperature arithmetic operation unit configured to estimate the temperature of the electric wire based on a second pseudo-heat generation temperature arithmetic expression and a second pseudo-heat radiation temperature arithmetic expression;
an overcurrent determination unit configured to determine that, when the current detected by the current detection unit is smaller than a preset predetermined threshold current, and an estimated temperature calculated by the first temperature arithmetic operation unit has reached a first allowed temperature, the current thus detected is an overcurrent, and when the current detected by the current detection unit is equal to or larger than the threshold current, and an estimated temperature calculated by the second temperature arithmetic operation unit has reached a second allowed temperature, the current thus detected is an over current; and
a breaking control unit configured to break the switch portion when the overcurrent determination unit has determined that the detected current is the overcurrent, wherein the first pseudo-heat generation temperature arithmetic expression and the first pseudo-heat radiation temperature arithmetic expression are set in such a manner that, in a temperature arithmetic expression of the electric wire, the temperature arithmetic expression using the elapsed time counted by the timer, the current detected by the current detection unit, and a heat capacity and conductor resistance of the electric wire, a first pseudo-heat capacity is assigned to the heat capacity, the second pseudo-heat generation temperature arithmetic expression and the second pseudo-heat radiation temperature arithmetic expression are set in such a manner that a second pseudo-heat capacity is assigned to the heat capacity in the temperature arithmetic expression of the electric wire, and the first and second pseudo-heat capacities are different from each other;

wherein a value of the first pseudo-heat capacity is smaller than a value of the heat capacity of the electric wire, and a value of the second pseudo-heat capacity is smaller than a value of the first pseudo-heat capacity.

7. The protection apparatus of a load circuit according to claim 6,
wherein the breaking control unit is further configured to turn the switch portion to a connection-enabled state when the temperatures of the electric wire, which are estimated by the first temperature arithmetic operation unit and the second temperature arithmetic operation unit, have dropped to an ambient temperature after the switch portion was broken.

8. The protection apparatus of a load circuit according to claim 6,
wherein the first pseudo-heat capacity is set so that current/breaking time characteristics which are based on the first pseudo-heat generation temperature arithmetic expression and the first pseudo-heat radiation arithmetic expression can be located between minimum current/breaking time characteristics of a fuse protecting the electric wire and maximum current/breaking time characteristics of the fuse, and
the second pseudo-heat capacity is set so that current/breaking time characteristics which are based on the second pseudo-heat generation temperature arithmetic expression and the second pseudo-heat radiation arithmetic expression can be lower than current/breaking time characteristics of an electronic switch through which the current flows, the electronic switch being used for the load circuit.

9. The protection apparatus of a load circuit according to claim 6,
wherein the temperature arithmetic expression of the electric wire is:

$$T2 = T1 + I1^2 rR\{1 - \exp[-t/(C \cdot R)]\} \quad (1)$$

$$T2 = T1 + I2^2 rR\{\exp[-t/(C \cdot R)]\} \quad (2)$$

in which Expression (1) is a temperature arithmetic expression at a time of heat generation, and Expression (2) is a temperature arithmetic expression at a time of heat radiation, where T1 is an ambient temperature [° C.], T2 is an estimated temperature [° C.] of the electric wire, I1 and I2 are energization currents [A], r is an electric wire conductor resistance [Ω], R is a thermal resistance [° C./W], C is a heat capacity [J/° C.], and t is a time [sec].

10. The protection apparatus of a load circuit according to claim 6,
wherein the first allowed temperature is lower than the second allowed temperature.

* * * * *